(12) United States Patent
Utsunomiya et al.

(10) Patent No.: US 12,335,061 B2
(45) Date of Patent: Jun. 17, 2025

(54) EVALUATION ASSISTING SYSTEM, INFORMATION PROCESSING DEVICE, EVALUATION ASSISTING METHOD, AND RECORDING MEDIUM

(71) Applicants: Shohhei Utsunomiya, Kanagawa (JP); Eiichiro Yoshida, Kanagawa (JP)

(72) Inventors: Shohhei Utsunomiya, Kanagawa (JP); Eiichiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 61 days.

(21) Appl. No.: 18/169,409

(22) Filed: Feb. 15, 2023

(65) Prior Publication Data
US 2023/0269109 A1    Aug. 24, 2023

(30) Foreign Application Priority Data
Feb. 18, 2022   (JP) ................. 2022-024134

(51) Int. Cl.
*H04L 12/18* (2006.01)
(52) U.S. Cl.
CPC ...... *H04L 12/1831* (2013.01); *H04L 12/1822* (2013.01)
(58) Field of Classification Search
CPC .............. H04L 12/1831; H04L 12/1822; H04L 41/5093; H04L 41/509; H04L 41/026; H04L 12/1813; H04L 51/02; G06F 13/00; G06F 16/908; G06Q 10/10; G06Q 10/00
USPC ........................ 709/204, 217, 238
See application file for complete search history.

(56) References Cited

U.S. PATENT DOCUMENTS

| | | | |
|---|---|---|---|
| 9,633,308 B2* | 4/2017 | Tateno | G06N 5/04 |
| 10,925,533 B2* | 2/2021 | Bruno | G16H 20/70 |
| 2004/0215502 A1* | 10/2004 | Takahashi | G06Q 10/0639 |
| | | | 705/7.38 |
| 2008/0168360 A1* | 7/2008 | Wilson | G06Q 10/107 |
| | | | 715/752 |

(Continued)

FOREIGN PATENT DOCUMENTS

| | | |
|---|---|---|
| JP | 2009-070290 | 4/2009 |
| JP | 6379270 | 8/2018 |

(Continued)

*Primary Examiner* — Sargon N Nano
(74) *Attorney, Agent, or Firm* — IPUSA, PLLC

(57) ABSTRACT

An evaluation assisting system includes circuitry and a memory storing executable instructions that cause the circuitry to: connect with a first system and a second system via a network, the first system allowing communication between users and the second system managing evaluations of objects of evaluation; receive communication information from the first system via the network, the received communication information relating to predetermined communication that takes place between the users in the first system, and including first information for specifying an object of evaluation; generate a request for registration of an evaluation of the object of evaluation with the second system, the object of evaluation being specified based on the first information included in the received communication information, and the evaluation being based on the predetermined communication related with the received communication information; and send the generated request for registration to the second system via the network.

20 Claims, 31 Drawing Sheets

(56) References Cited

U.S. PATENT DOCUMENTS

| | | | |
|---|---|---|---|
| 2009/0077169 A1* | 3/2009 | Ikeura | H04L 67/51 |
| | | | 709/203 |
| 2011/0072052 A1* | 3/2011 | Skarin | G06F 16/288 |
| | | | 707/E17.098 |
| 2016/0006744 A1* | 1/2016 | Du | H04L 67/12 |
| | | | 726/4 |
| 2018/0337927 A1* | 11/2018 | Carnahan | H04L 63/10 |
| 2019/0050269 A1* | 2/2019 | Anderson | G06F 9/5077 |
| 2019/0130512 A1* | 5/2019 | Kuhn | H04L 67/00 |
| 2021/0264372 A1* | 8/2021 | Asseer | G06Q 10/1053 |

FOREIGN PATENT DOCUMENTS

| | | |
|---|---|---|
| JP | 2020-057067 | 4/2020 |
| JP | 6767728 | 10/2020 |
| JP | 2021-135602 | 9/2021 |

\* cited by examiner

| ITEM | EXAMPLE OF INFORMATION |
|---|---|
| SENDER-USER'S NAME | USER A |
| RECIPIENT-USER'S NAME | USER B |
| THANKS MESSAGE | THANK YOU FOR ○○ |
| THANKS POINTS | 1 |
| SYSTEM NAME | COMMUNICATION SYSTEM |

| ITEM | EXAMPLE OF INFORMATION |
|---|---|
| SENDER-USER ID | USER 01 |
| RECIPIENT-USER ID | USER 02 |
| THANKS MESSAGE | THANK YOU FOR ○○ |
| THANKS POINTS | 5 |
| SYSTEM ID | SYSTEM 01 |

| ITEM | EXAMPLE OF INFORMATION |
|---|---|
| USER NAME | USER A |
| USER ID | USER 01 |
| E-MAIL ADDRESS | userA_xx@***.com |
| DEPARTMENT | ○×DEPARTMENT △SECTION |
| POSITION TITLE | GL |
| ... | ... |

| ITEM | EXAMPLE OF INFORMATION |
|---|---|
| SENDER-USER ID | USER 01 |
| RECIPIENT-USER ID | USER 02 |
| THANKS MESSAGE | THANK YOU FOR ○○ |
| THANKS POINTS | 1 |

| ITEM | EXAMPLE OF INFORMATION |
|---|---|
| SENDER-USER'S E-MAIL ADDRESS | userA_xx@***.com |
| RECIPIENT-USER'S E-MAIL ADDRESS | userB_xx@***.com |
| THANKS MESSAGE | THANK YOU FOR ○○ |
| THANKS POINTS | 5 |

| ITEM | EXAMPLE OF INFORMATION |
|---|---|
| RECIPIENT-USER'S E-MAIL ADDRESS | userB_xx@***.com |
| THANKS MESSAGE | THANK YOU FOR ○○ |
| THANKS POINTS | 5 |

FIG.14A

| ITEM | EXAMPLE OF INFORMATION |
|---|---|
| SENDER-USER'S NAME | USER B |
| RECIPIENT-USER'S NAME | USER A |
| RETURN MESSAGE | (YOU ARE WELCOME!) |
| SYSTEM NAME | COMMUNICATION SYSTEM |

| ITEM | EXAMPLE OF INFORMATION |
|---|---|
| SENDER-USER'S NAME | USER 02 |
| RECIPIENT-USER'S NAME | USER 01 |
| RETURN MESSAGE | (YOU ARE WELCOME!) |

| SYSTEM ID | POINTS MULTIPLIED BY |
|---|---|
| SYSTEM 01 | 2x |
| SYSTEM 02 | 1x |
| ... | ... |

FIG.16B

| PERIOD | POINTS MULTIPLIED BY |
|---|---|
| 3/1-5/10 | 3x |
| OTHER THAN ABOVE | 1x |
| ... | ... |

FIG.16C

| KEYWORD | ADDITIONAL POINTS |
|---|---|
| KEYWORD 1 | 2 POINTS |
| KEYWORD 2 | 1 POINT |
| ... | ... |

FIG.20A

```
                                                     ─2010
┌─────────────────────────────────────────────────────┐
│  USER A 15:06                                       │
│     @USER B   THANK YOU FOR REVIEW                  │
│                                                     │
└─────────────────────────────────────────────────────┘
```

FIG.20B

```
                                                     ─2020
┌─────────────────────────────────────────────────────┐
│  USER A 15:06                                       │
│     @USER B   THANK YOU FOR REVIEW   THANKS         │
│                                      ⌣              │
│                                      2021           │
└─────────────────────────────────────────────────────┘
```

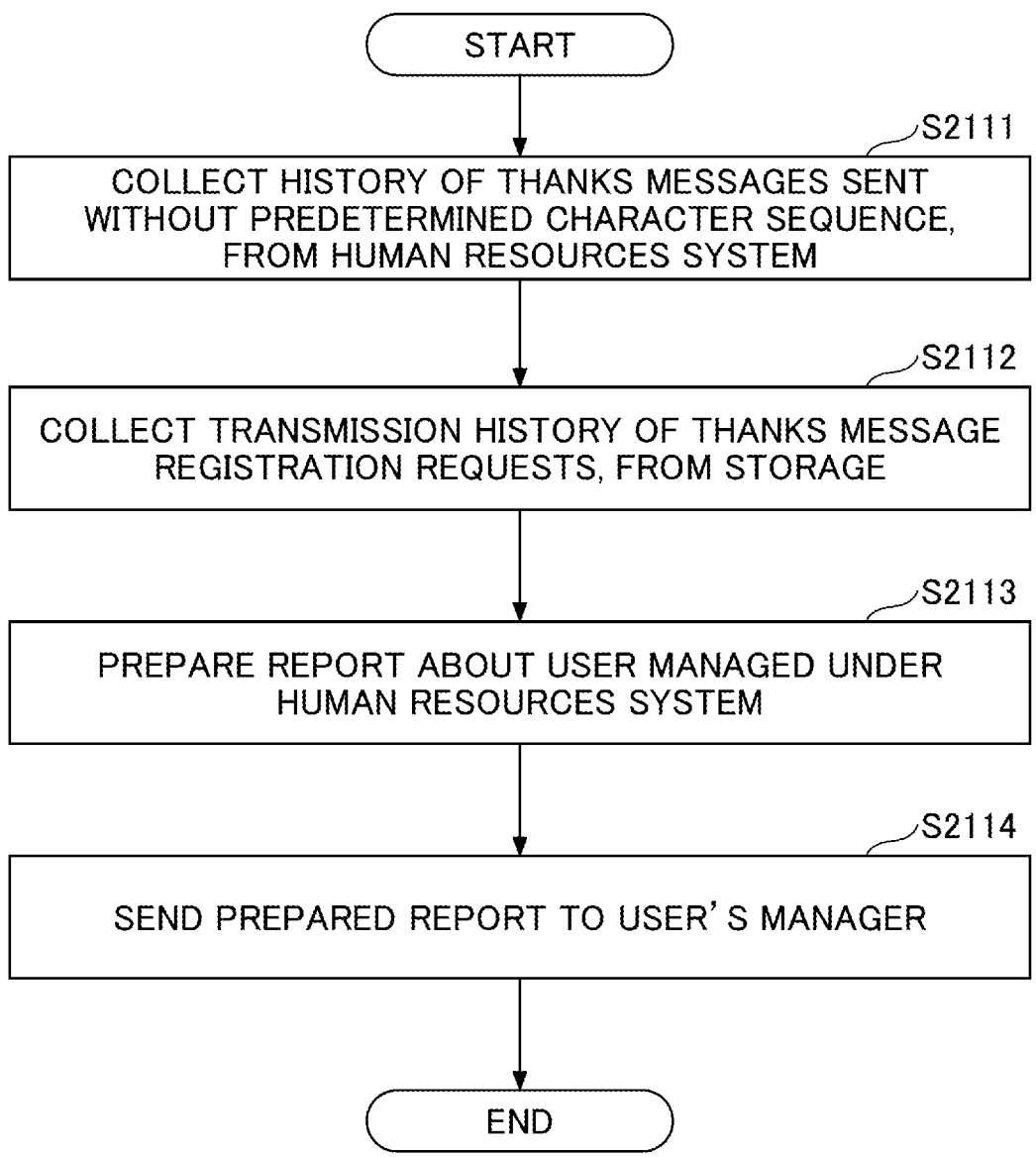

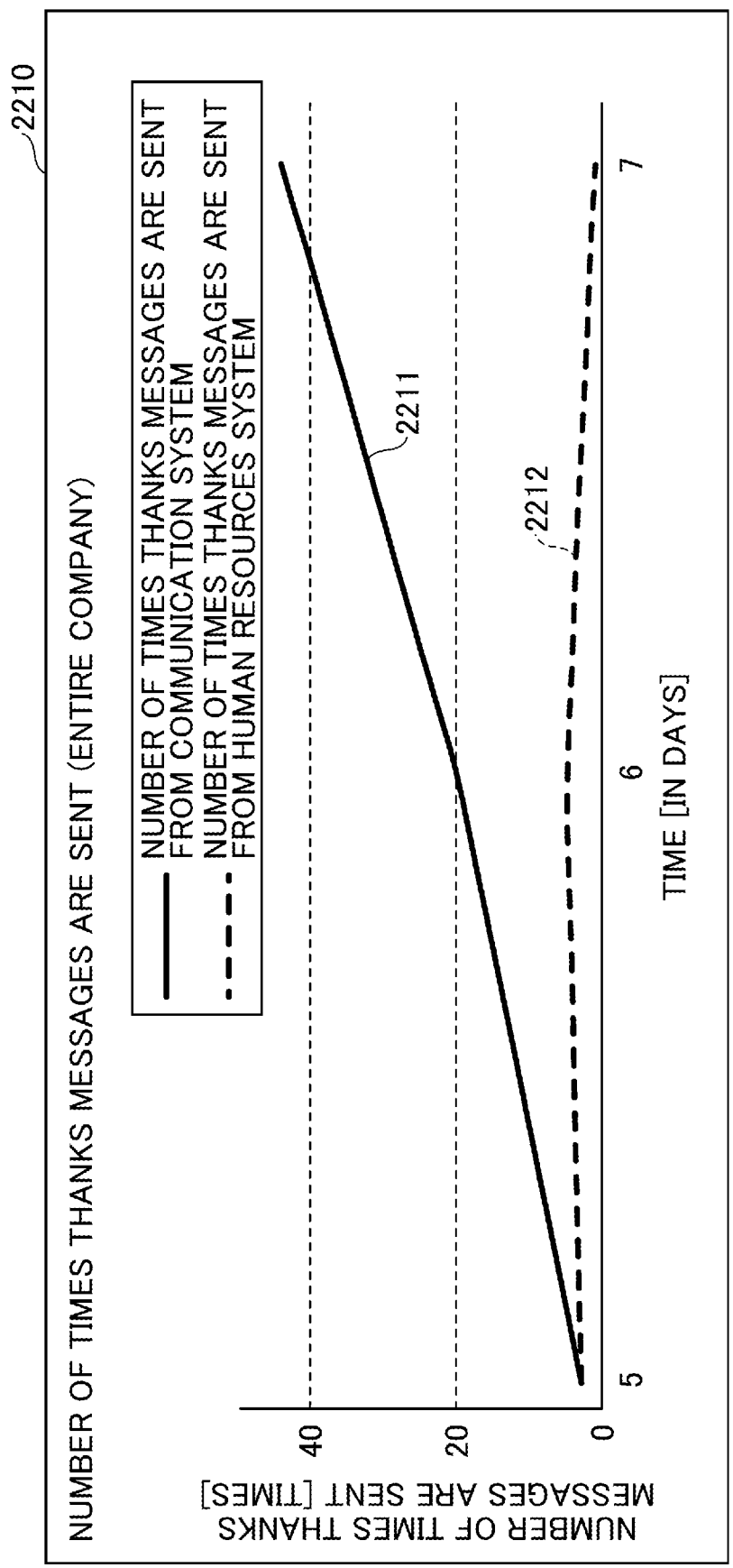

FIG.24A

| NAME OF DEPARTMENT | THANKS INSIDE DEPARTMENT | | | THANKS TO OUTSIDE DEPARTMENT | | | THANKS FROM OUTSIDE DEPARTMENT |
|---|---|---|---|---|---|---|---|
| | HUMAN RESOURCES SYSTEM | COMMUNICATION SYSTEM | TOTAL | HUMAN RESOURCES SYSTEM | COMMUNICATION SYSTEM | TOTAL | TOTAL |
| GROUP 1 | 2 | 138 | 140 | 20 | 2 | 22 | 25 |
| GROUP 2 | 1 | 50 | 51 | 5 | 0 | 5 | 10 |
| ... | ... | ... | ... | ... | ... | ... | ... |

| NAME OF DEPARTMENT | THANKS INSIDE DEPARTMENT | | THANKS TO OUTSIDE DEPARTMENT | | | THANKS FROM OUTSIDE DEPARTMENT | | | 2402 |
|---|---|---|---|---|---|---|---|---|---|
| | STAFF/EMPLOYEES WITH TITLE | STAFF/EMPLOYEES TOTAL | STAFF/EMPLOYEES | STAFF/EMPLOYEES WITH TITLE | TOTAL | STAFF/EMPLOYEES | STAFF/EMPLOYEES WITH TITLE | TOTAL | |
| GROUP 1 | 78 | 140 | 15 | 7 | 22 | 15 | 10 | 25 | |
| GROUP 2 | 21 | 51 | 5 | 0 | 5 | 5 | 5 | 10 | |
| ... | ... | ... | ... | ... | ... | ... | ... | ... | |

FIG.24C

| NAME OF USER | THANKS INSIDE DEPARTMENT | THANKS TO OUTSIDE DEPARTMENT | THANKS FROM OUTSIDE DEPARTMENT | THANKS POINTS | RATE OF USE OF EVALUATION ASSISTING SYSTEM |
|---|---|---|---|---|---|
| USER A | 30 | 10 | 11 | 280 POINTS | 75% |
| USER B | 15 | 2 | 1 | 115 POINTS | 10% |
| ... | ... | ... | ... | ... | ... |

2403

EVALUATION ASSISTING SYSTEM, INFORMATION PROCESSING DEVICE, EVALUATION ASSISTING METHOD, AND RECORDING MEDIUM

CROSS-REFERENCE TO RELATED APPLICATIONS

The present application claims priority under 35 U.S.C. § 119 to Japanese Patent Application No. 2022-024134, filed Feb. 18, 2022, the contents of which are incorporated herein by reference in their entirety.

BACKGROUND OF THE INVENTION

1. Field of the Invention

The present invention relates to an evaluation assisting system, an information processing device, an evaluation assisting method, and a recording medium.

2. Description of the Related Art

Communication systems for allowing a plurality of users to communicate with each other such as, for example, video conferences, voice calls, information sharing, chats, instant messages, and so forth have gained popularity.

Also known is a chat analyzing device that analyzes chats between users and outputs communication-related analysis results (for example, see Patent Document 1).

RELATED-ART DOCUMENT

Patent Document

[Patent Document 1] Unexamined Japanese Patent Application Publication No. 2020-57067

SUMMARY OF THE INVENTION

Organizations such as private companies often manage human resources information, such as evaluation information of users within the organizations by using systems such as human resources systems and so on, based on organizational information that is managed by each organized team/group. In such a system, for example, even if a new mechanism is introduced that allows the users to evaluate each other, the users have to log in to the system every time they evaluate someone, or the users are unable to find out how to use the system, and therefore the system may not be used in an ideal manner.

Note that this problem is by no means limited to human resources systems that manage user evaluation information, and applies likewise to other systems that manage evaluation information of various objects that are subject to evaluation, such as products, shops, or services. Also, this problem cannot be solved by simply applying the technology disclosed in, for example, Patent Document 1.

Therefore, embodiments of the present invention are designed so as to make it possible to register the evaluation of the object of evaluation, with a second system that manages the evaluations of objects of evaluation, by using a first system that allows communication between a plurality of users.

In order to solve the above problem, an evaluation assisting system according to at least one embodiment of the present invention provides an evaluation assisting system is provided, including circuitry and a memory storing executable instructions which, when executed by the circuitry, cause the circuitry to: connect with a first system and a second system via a network, the first system allowing communication between a plurality of users and the second system managing evaluations of objects of evaluation; receive communication information from the first system via the network, the received communication information relating to predetermined communication that takes place between the plurality of users in the first system, and including first information for specifying an object of evaluation; generate a request for registration of an evaluation of the object of evaluation with the second system, the object of evaluation being specified based on the first information included in the received communication information, and the evaluation being based on the predetermined communication related with the received communication information; and send the generated request for registration to the second system via the network.

According to one embodiment of the present invention, it becomes possible, by using a first system that allows communication between a plurality of users, to register the evaluation of the object of evaluation, with a second system that manages the evaluations of objects of evaluation.

BRIEF DESCRIPTION OF THE DRAWINGS

FIGS. 7A, 7B, 7C, 7D, 7E, and 7F are diagrams that illustrate examples of information handled by the evaluation assisting device according to the first embodiment;

FIGS. 14A and 14B are diagrams that illustrate examples of information handled by the evaluation assisting device according to the second embodiment;

FIGS. 16A, 16B, and 16C are diagrams that illustrate examples of point information according to the third embodiment;

FIGS. 20A and 20B are diagrams that illustrate examples of thanks messages according to the fourth embodiment;

FIGS. 21A and 21B show flowcharts that illustrate example information providing processes according to the fourth embodiment;

FIGS. 22A and 22B are diagrams (1) that illustrates examples of information provided by an evaluation assisting system according to the fourth embodiment;

FIGS. 24A, 24B, and 24C are diagrams (3) that illustrate examples of information provided by the evaluation assisting system according to the fourth embodiment.

DESCRIPTION OF EMBODIMENTS

Embodiments of the present invention will be described below with reference to the accompanying drawings.
<System Structure>

Figure 1:
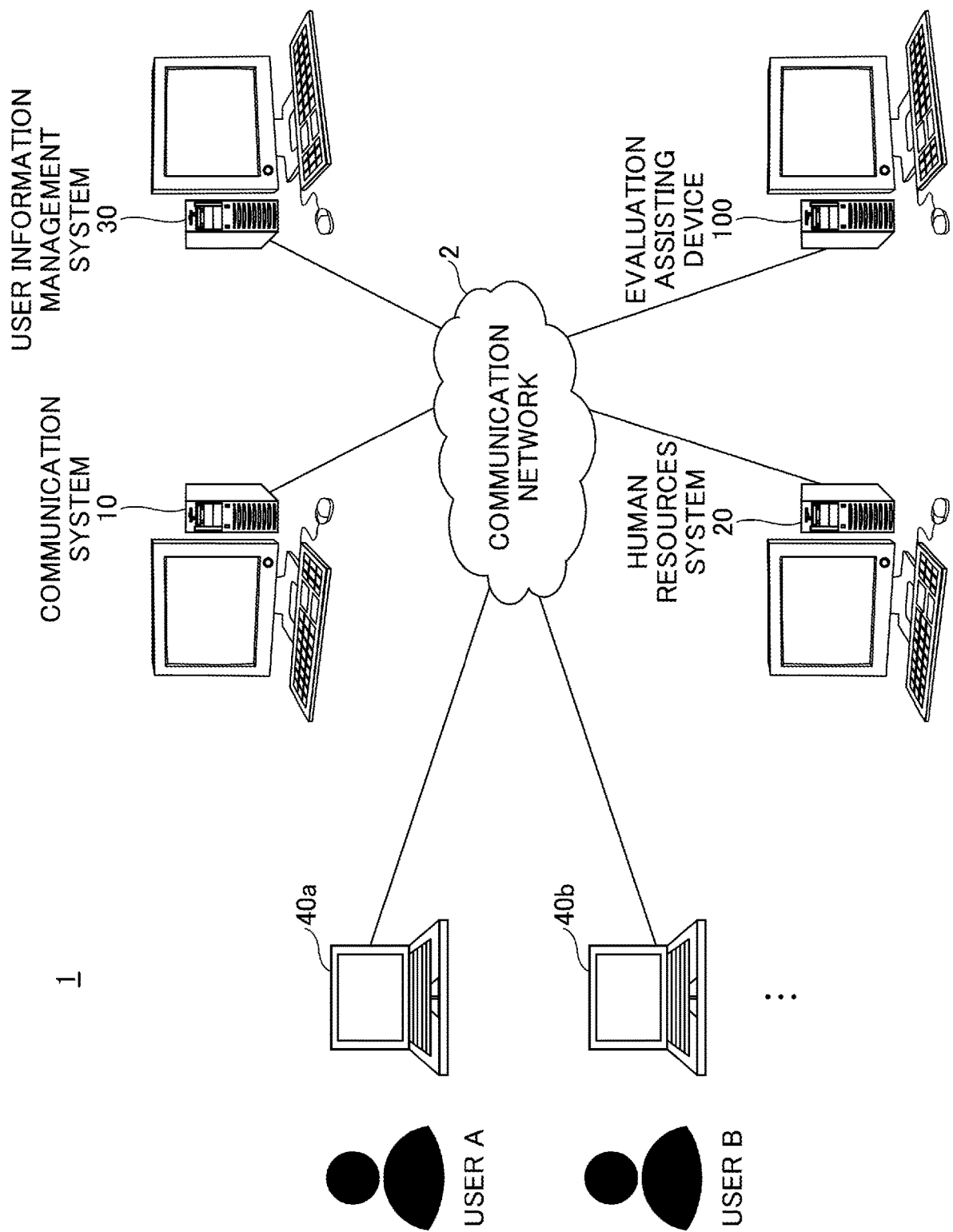
FIG. 1 is a diagram that illustrates an example system structure of an information processing system according to one embodiment.

FIG. 1 is a diagram that illustrates an example system structure of an information processing system according to one embodiment. An information processing system 1 includes, for example, a communication system 10, a human resources system 20, a user information management system 30, an evaluation assisting device 100, and so forth, which are connected to a communication network 2 such as the Internet or a LAN (Local Area Network).

The communication system (first system) 10 is a system including an information processing device having a computer configuration or a plurality of information processing devices, and is an example of a first system that allows communication between a plurality of users. The communication system 10 provides communication services such as, for example, video conferences, voice calls, information sharing, chatting, instant messaging, and so forth, between a plurality of users (user A, user B, and so on).

For example, user A can use an information terminal 40a such as a PC (Personal Computer), a smart phone, or a tablet terminal, connect to the communication system 10 via the communication network 2, and participate in a video conference, for example. Similarly, user B can use an information terminal 40b, connect to the communication system 10 via the communication network 2, and participate in the same video conference with user A, sending and receiving video and audio to and from user A. Note that three or more users may participate in this video conference.

Also, user A can use the information terminal 40a, and, by using functions such as chatting or instant messaging that are provided by the communication system 10, send and receive text messages to and from user B who uses the information terminal 40b.

Examples of the communication system 10 include for example, Microsoft Teams (registered trademark), ZOOM (registered trademark), LINE (registered trademark), and Slack (registered trademark). Here, for ease of explanation, the following description will assume that the communication system 10 is Microsoft Teams (hereinafter referred to as "Teams").

Teams is an example of the communication system 10 that provides a chat service for sending and receiving text messages within a group, a conference service for sending and receiving audio or video, and a sharing service for sharing files and the like.

The human resources system (second system) 20 is an information processing device having a computer configuration or a system including a plurality of information processing devices, and is an example of a second system that manages the evaluations of objects of evaluation. In an organized team/group such as a company, the human resources system 20 is, for example, a system for managing the human resources information and the like of a plurality of users belonging to the organized team/group. The human resources system 20 may be a system that is unique to each organized team/group, or may be a general-purpose system such as Talent Palette (registered trademark). Here, for ease of explanation, the following description will assume that the human resources system 20 is Talent Palette that manages the human resources information of a plurality of users.

Talent Palette is an example of the human resources system 20 that provides human resources services such as, for example, user recruitment, training, placement, evaluation, promotion, or active career development, by collecting together a plurality of users' human resources information.

The user information management system (third system) 30 is a system including an information processing device having a computer configuration or a plurality of information processing devices, and is an example of a third system that manages information about the object of evaluation. The user information management system 30 manages, for example, user information of users whose human resources information is managed under the human resources system 20, organizational information, and the like. The user information management system 30 may be a system that is unique to each organized team/group, or may be a general-purpose system such as Microsoft Outlook (registered trademark).

Preferably, the providers of the communication system 10 and the user information management system 30 are the same company or affiliated companies. Here, for ease of explanation, the following description will assume that the user information management system 30 is Microsoft Outlook (hereinafter referred to as "Outlook").

Outlook is an example of the user information management system 30 that manages user names, IDs, contact information, affiliations, position titles, schedules, to-do lists, and so forth.

The evaluation assisting device (information processing device) 100 is an information processing device having a computer configuration or a system including a plurality of information processing devices. The evaluation assisting device 100 is communicably connected with the communication system 10, the human resources system 20, the user information management system 30, and the like, via the communication network 2, for example.

Here, assume that the human resources system 20 has a thanks message service for sending and receiving thanks messages between employees for the purpose of mutual understanding among employees and fostering a culture of appreciation. For example, Talent Palette, which is an example of the human resources system 20, has a thanks point function that allows employees to send thanks to each other with text messages and points. Here, thanks is an evaluation of communication that takes place between users in daily communication.

However, even if such a thanks message service is introduced, this service may not gain popularity due to reasons such as, for example, the user must access the human resources system 20 every time he/she sends a thanks message, the user is unsure of how to use the service properly, and so forth.

Therefore, the evaluation assisting device 100 according to the present embodiment makes it possible to register thanks messages with the human resources system (second system) 20 by using the communication system (first system) 10.

<Process Overview>

Figure 2:
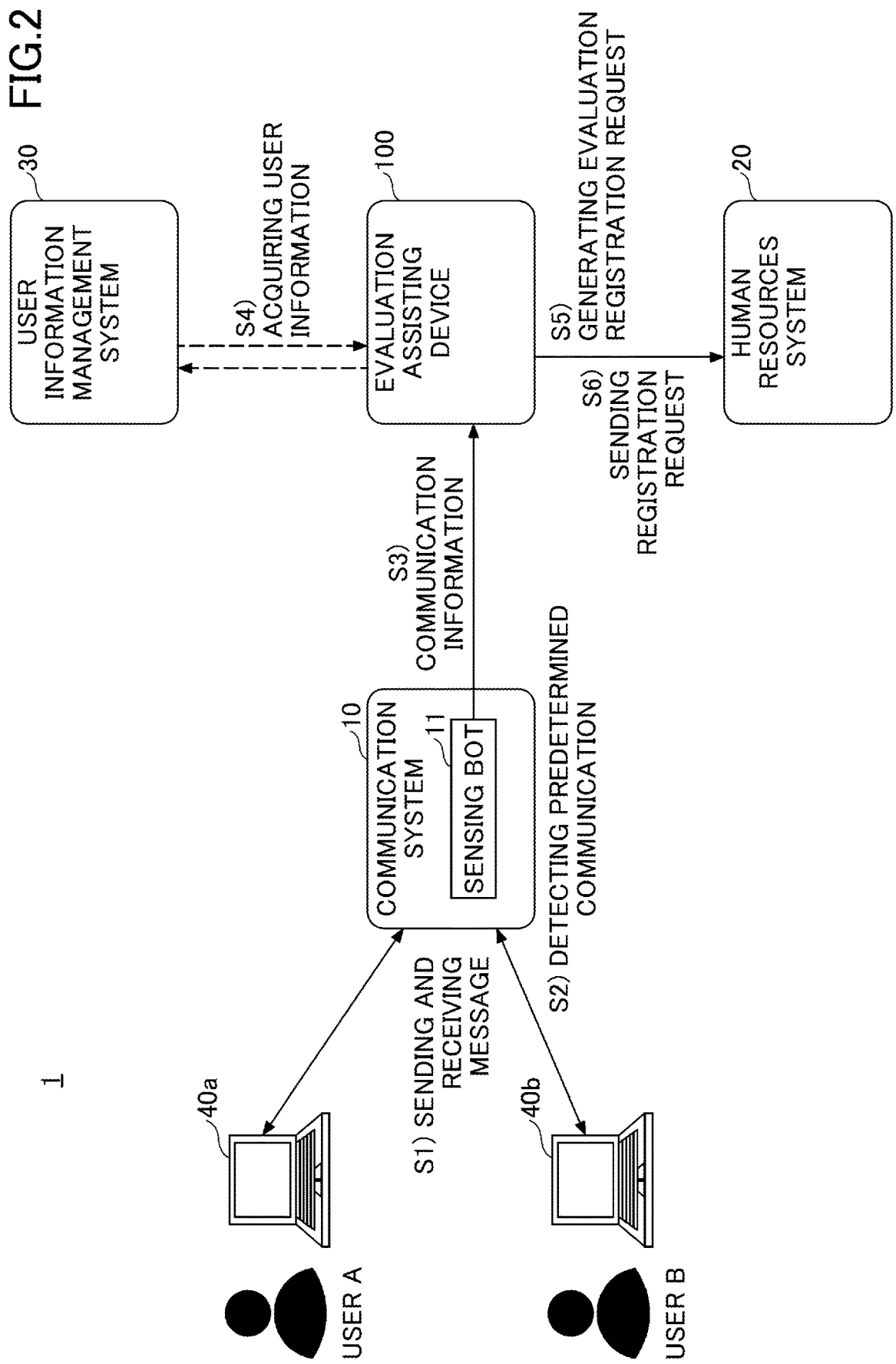
FIG. 2 is a diagram that explains a process overview according to one embodiment.

FIG. 2 is a diagram that explains an overview of the process according to one embodiment. For example, assume that user A and user B use the information terminals 40a and 40b and the communication system 10 to send and receive text messages with each other (step S1).

The communication system 10 has a sensing bot 11 that senses predetermined communication, and senses predetermined communication such as for example, a thanks message and the like, from the messages sent and received between user A and user B (step S2).

Here, the sensing bot 11 can be realized, for example, by applying technology such as a chatbot that automatically responds to queries sent from the users in natural language. A chatbot is realized by "interpretation of intention," in which what the user wants to do is determined from the voice or text input by the user, and "dialogue control," in which the content of response is generated in accordance with the interpreted intention.

For example, the sensing bot 11 has multiple example sentences and their intended meanings registered therewith in advance in association with each other, so that, for example, when text data such as "Thank you for XX" is entered, the sensing bot 11 can determine that this is an expression of appreciation. Alternatively, the sensing bot 11 may detect thanks messages by using a machine learning model that is trained in advance so as to extract thanks messages from text data.

Here, machine learning refers to a technology that allows a computer to acquire human-like learning abilities such that the computer, for example, autonomously generates an algorithm that is needed to identify data, from the training data that is learned in advance, and makes predictions by applying this to new data. The learning method for machine learning may be supervised learning, unsupervised learning, semi-supervised learning, reinforcement learning, or deep learning. Furthermore, a learning method combining these learning methods may be used, and/or any other learning method for machine learning can be used.

Also, when, for example, the sensing bot 11 senses predetermined communication such as a thanks message, the sensing bot 11 sends communication information that indicates that predetermined communication has been detected, to an evaluation assisting device 100 via the communication network 2 (step S3). This communication information includes, for example, text data such as that of the thanks message, and information such as the sender's user name and the recipient's user name. Preferably, this communication information includes score information that expresses the degree of appreciation such as thanks points.

When receiving the communication information from the communication system 10, the evaluation assisting device 100 acquires user information from the user information management system 30, by using the user name and the like included in the received communication information (step S4).

For example, the evaluation assisting device 100 acquires identification information for identifying the recipient-user in the human resources system 20, from the user information management system 30, by using the recipient's user name included in the received communication information. Also, if necessary, the evaluation assisting device 100 obtains identification information for identifying the sender-user in the human resources system 20, from the user information management system 30, by using the sender's user name included in the received communication information. The identification information for identifying the users in the human resources system 20 includes, for example, user IDs, employee IDs, e-mail addresses, and so forth.

Note that the user information which the user information management system 30 holds may be held by, for example, the evaluation assisting device 100, or may be held by the human resources system 20. In this case, the information processing system 1 does not have to have the user information management system 30.

Also, the evaluation assisting device 100 generates a request for registering the evaluation for the recipient-user (step S5). For example, when the predetermined communication is a thanks message, the evaluation assisting device 100 generates a request for registration of the thanks message from the sender-user to the recipient-user. This thanks message registration request includes information such as, for example, identification information that identifies the sender-user, identification information that identifies the recipient-user, the thanks message, and the thanks points.

Furthermore, the evaluation assisting device 100 sends the generated registration request to the human resources system 20 via the communication network 2 (step S6).

Through the process of above steps S1 to S6, the user can easily register a thanks message with the human resources system 20 by using the communication system 10.

Note that the information processing system 1 described with reference to FIG. 1 and FIG. 2 is an example. For example, the predetermined communication that the sensing bot 11 senses is not limited to a thanks message, and may be, for example, evaluation messages that evaluate various objects of evaluation such as organized teams/groups, shops, exhibitions, concerts, goods, products, cuisine, vehicles, entertainment facilities, lodging facilities, sightseeing spots, or services. In this cases, the human resources system 20 may be various systems that manage the evaluation of the above-listed objects of evaluation.

Also, the evaluation registration request that the evaluation assisting device 100 sends may not include identification information that identifies the sender-user, score information, or the like, depending on the object of evaluation.

Furthermore, three or more users may send and receive messages with each other. For example, if the communication system 10 is Teams, a user can specify a mention name and send a message to the specified user alone. Based on this mention name, the sensing bot 11 may specify the recipient's user name.

Also, the sensing bot 11 may detect a predetermined message such as a thanks message not only from a text message, but also from, for example, a voice call message. In this case, the sensing bot 11 may specify the recipient-user or the sender-user by using technology such as speaker recognition, or may specify the recipient-user or the sender-user from the communication system 10. Also, in this case, the sensing bot 11 may convert the voice message to a text message by using speech recognition technology, and thus sense predetermined communication in a similar fashion to a text message.

As described above, according to the present embodiment, by using a communication system (first system) 10 that allows communication between a plurality of users, the evaluation of the object of evaluation can be easily registered with a second system that manages the evaluations of objects of evaluation.

<Hardware Structure>

Figure 3:
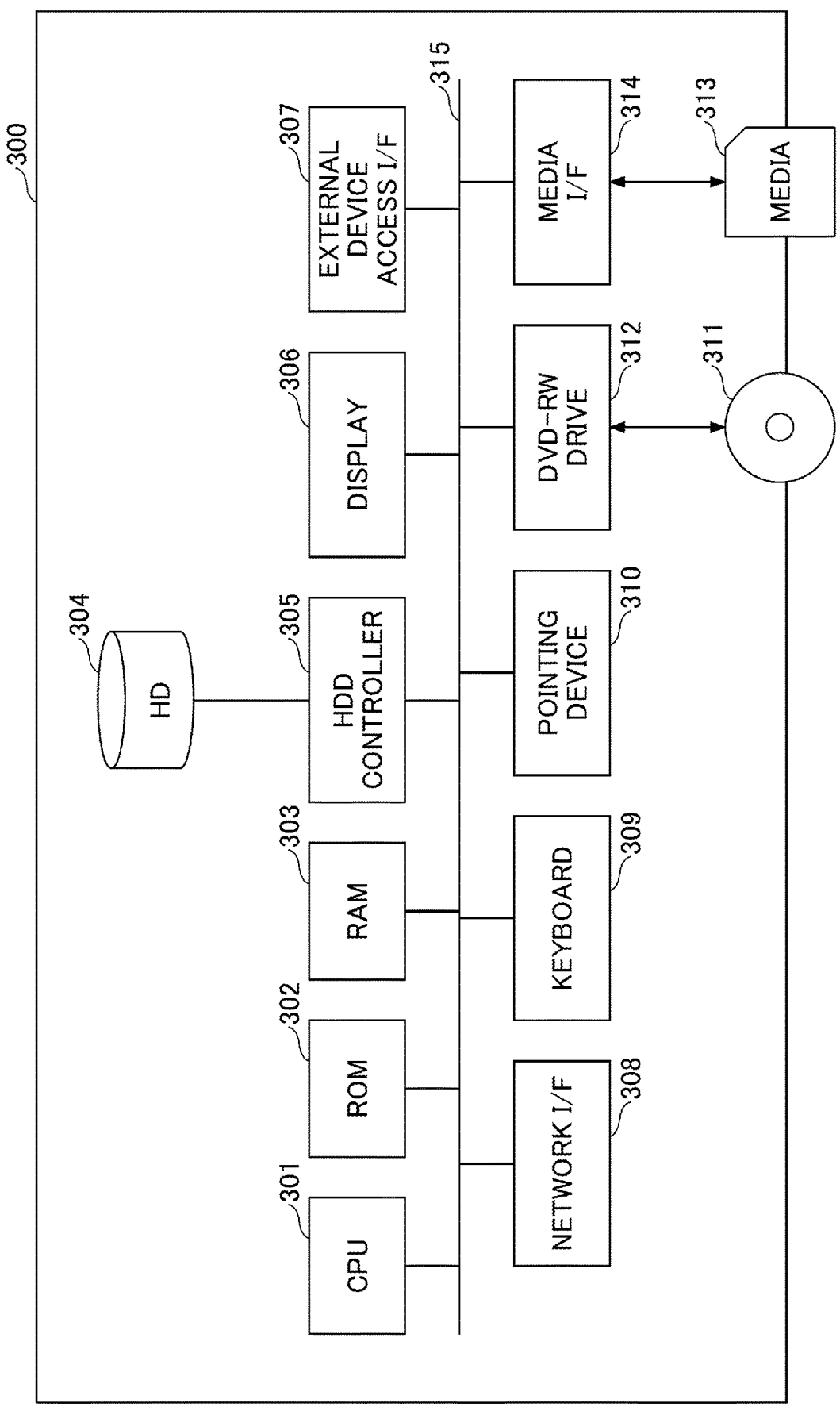
FIG. 3 is a diagram that illustrates an example hardware structure of a computer according to one embodiment.

The communication system 10, the human resources system 20, the user information management system 30, the evaluation assisting device 100, the information terminals 40a and 40b, and so forth, shown in FIG. 1, have the hardware structure of the computer 300 shown in FIG. 3. Alternatively, the communication system 10, the human resources system 20, the user information management system 30, the evaluation assisting device 100, and so forth may be configured by a plurality of computers 300.

FIG. 3 is a diagram that illustrates an example hardware structure of a computer according to one embodiment. The computer 300 includes, for example, a CPU (Central Process Unit) 301, a ROM (Read Only Memory) 302, a RAM (Random Access Memory) 303, an HD (Hard Disk) 304, an HDD (Hard Disk Drive) controller 305, a display 306, an external device access I/F (Interface) 307, a network I/F 308, a keyboard 309, a pointing device 310, a DVD-RW (Digital Versatile Disk ReWritable) drive 312, a media I/F 314, a bus line 315, and so forth.

Among these, the CPU 301 controls the overall operation of the computer 300. The ROM 302 stores the programs used to start the CPU 301, such as an IPL (Initial Program Loader). The RAM 303 is used as a work area or the like for the CPU 301. The HD 304 stores various data such as programs. The HDD controller 305 controls the reading or writing of various data to/from the HD 304 under the control of the CPU 301.

The display 306 displays various information such as a cursor, a menu, a window, characters, or images. The external device access I/F 307 is an interface for connecting various external devices. The network I/F 308 is an interface for communicating data by using a communication network N.

The keyboard 309 is a type of input means having a plurality of keys for inputting characters, numerical values, various instructions, and so forth. The pointing device 310 is a type of input means for selecting and executing various instructions, selecting the processing target, moving the cursor, and the like. The DVD-RW drive 312 controls the reading or writing of various data to a DVD-RW 311, which is an example of a removable recording medium. Note that the DVD-RW 311 is by no means limited to a DVD-RW, and may be another recording medium as well. The media I/F 314 controls the reading or writing (storage) of data to a media 313 such as a flash memory. The bus line 315 includes an address bus, a data bus, various control signals, and so forth for electrically connecting between the components described above.

<Functional Structure>

Next, the functional structure of the evaluation assisting device and the evaluation assisting system according to this embodiment will be described below.

Figure 4:
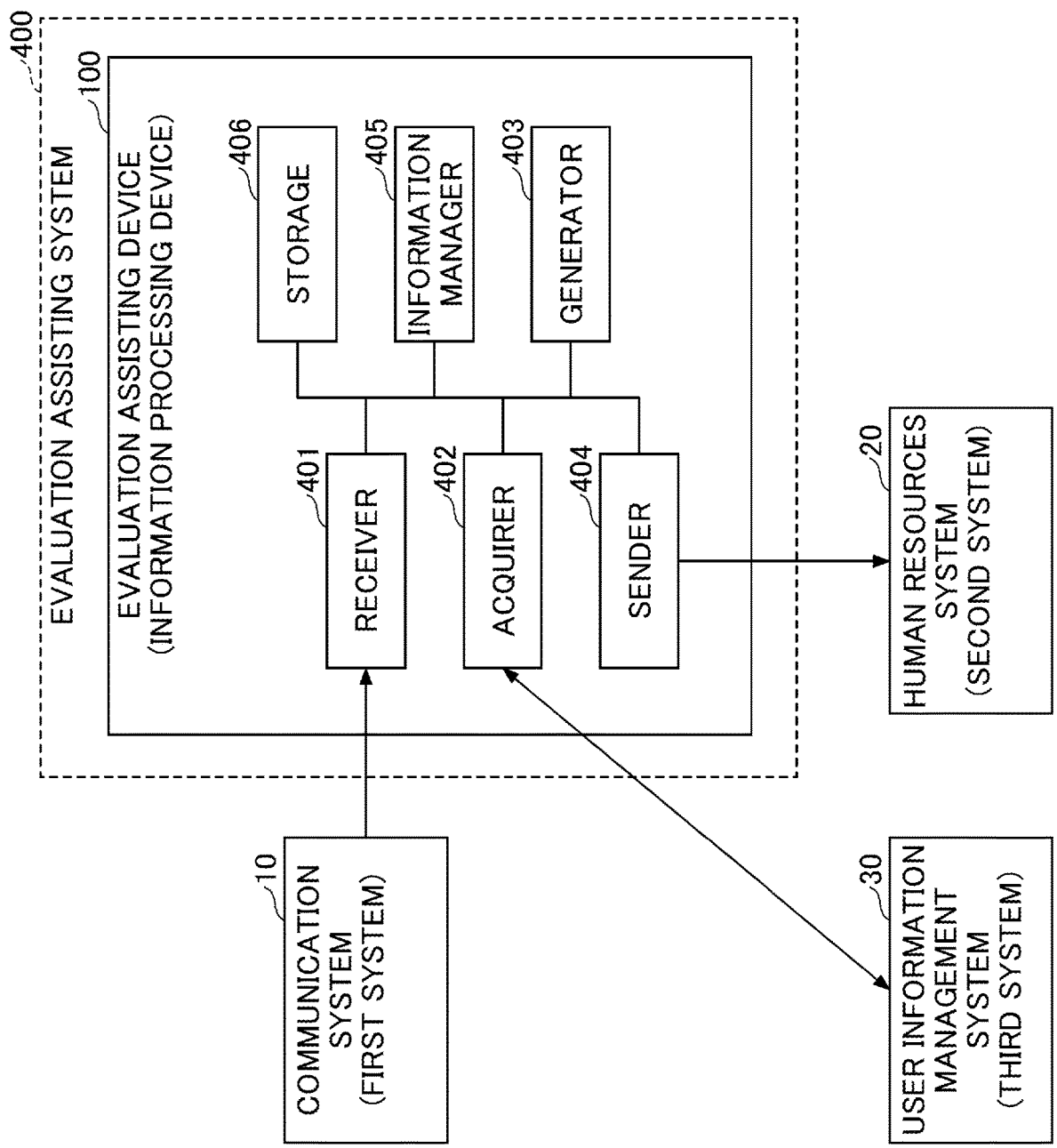
FIG. 4 is a diagram that illustrates an example functional structure of an evaluation assisting system according to one embodiment.

FIG. 4 is a diagram that illustrates an example functional structure of an evaluation assisting system according to one embodiment. When the communication system (first system) 10 has the functions of the sensing bot 11, which has been described above with reference to FIG. 2, the evaluation assisting system is implemented by the evaluation assisting device (information processing device) 100, as shown in FIG. 4.

(Functional Structure of Evaluation Assisting Device)

The evaluation assisting device 100 realizes a receiver 401, an acquirer 402, a generator 403, a sender 404, an information manager 405, and a storage 406 as, for example, the CPU 301 executes the programs stored in a recording medium such as the HD 304.

The receiver 401 uses, for example, the network I/F 308, to execute a receiving process of receiving communication information sent from the communication system (first system) 10. This communication information relates to predetermined communication that takes place between a plurality of users in the communication system (first system) 10, and includes information for specifying the object of evaluation (first information).

In the example of FIG. 2, the receiver 401 receives communication information that indicates that a thanks message has been detected, from the communication system 10. This communication information includes information such as, for example, the sender-user's user name (an example of second information), the recipient-user's user name (an example of first information), the detected thanks message, and the thanks points. Preferably, this communication information includes identification information that identifies the communication system 10 (for example, the system name, the system ID, etc.).

Based on the first information included in the communication information received by the receiver 401, the acquirer 402 executes an acquiring process of acquiring information about the object of evaluation.

In the example of FIG. 2, the acquirer 402 acquires user information of the recipient-user from the user information management system 30, by using the user name of the recipient-user (an example of the first information) that is included in the communication information. This user information includes, for example, identification information that identifies the recipient-user in the human resources system (second system) 20 (for example, the user ID, the e-mail address, etc.). Preferably, this user information includes organizational information such as the department to which the recipient-user belongs, his/her position title, and so on.

Also, if necessary, the acquirer 402 acquires information about the sender-user based on the second information that is included in the communication information received by the receiver 401.

In the example of FIG. 2, the acquirer 402 acquires the sender-user's user information from the user information management system 30, by using the sender's user name (an example of second information) that is included in the communication information. This user information includes, for example, identification information that identifies the sender-user in the human resources system (second system) 20. Preferably, this user information includes organizational information such as the department to which the sender-user belongs, his/her position title, and so on.

Note that, when the communication information includes identification information that identifies the recipient-user in the human resources system 20 (for example, the user ID, the e-mail address, etc.), the acquirer 402 may acquire the identification information that identifies the recipient-user from the communication information. Similarly, if the communication information includes identification information that identifies the sender-user in the human resources system 20, the acquirer 402 may acquire the identification information that identifies the sender-user from the communication information.

The generator 403 executes a generation process of generating a request for registering the evaluation of the object of evaluation, specified based on the first information that is included in the communication information received by the receiver 401. This registration request includes the evaluation of the object of evaluation based on predetermined communication corresponding to the communication information.

In the example of FIG. 2, the generator 403 generates a request for registering the thanks message, including identification information that identifies the recipient-user in the human resources system 20, identification information that identifies the recipient user, the thanks message, the thanks points, and so forth. Note that the thanks message and the thanks points are examples of evaluation of the object of evaluation.

The sender 404 executes a sending process of sending the registration request generated by the generator 403, to the human resources system 20, via the communication network 2. The sender 404 sends the request for registering the evaluation of the object of evaluation to the human resources system 20 by using, for example, a Web API (Application Programming Interface) provided by the human resources system (second system) 20.

Note that the evaluation assisting device 100 according to the present embodiment sends the evaluation registration request by using an existing Web API provided by the human resources system 20, so that the existing human resources system 20 can be used on an as-is basis, without modifying it.

The information manager 405 executes an information management process to store and manage the request for registering the evaluation of the object of evaluation generated by the generator 403, or the evaluation registration request sent from the sender 404, in the storage 406 or the like. In the example of FIG. 2, the information manager 405 stores the thanks message registration request generated by the generator 403 or the thanks message registration request sent from the sender 404, in the storage 406 or the like.

The storage 406 is realized by, for example, a program executed by the CPU 301, the HD 304, the HDD controller 305, and so forth, and stores various information, including the above-described request for registering the evaluation of the object of evaluation, or the above-described thanks message registration request. Note that the storage 406 may be implemented by, for example, a storage server or the like that is external to the evaluation assisting device 100.

Figure 5:
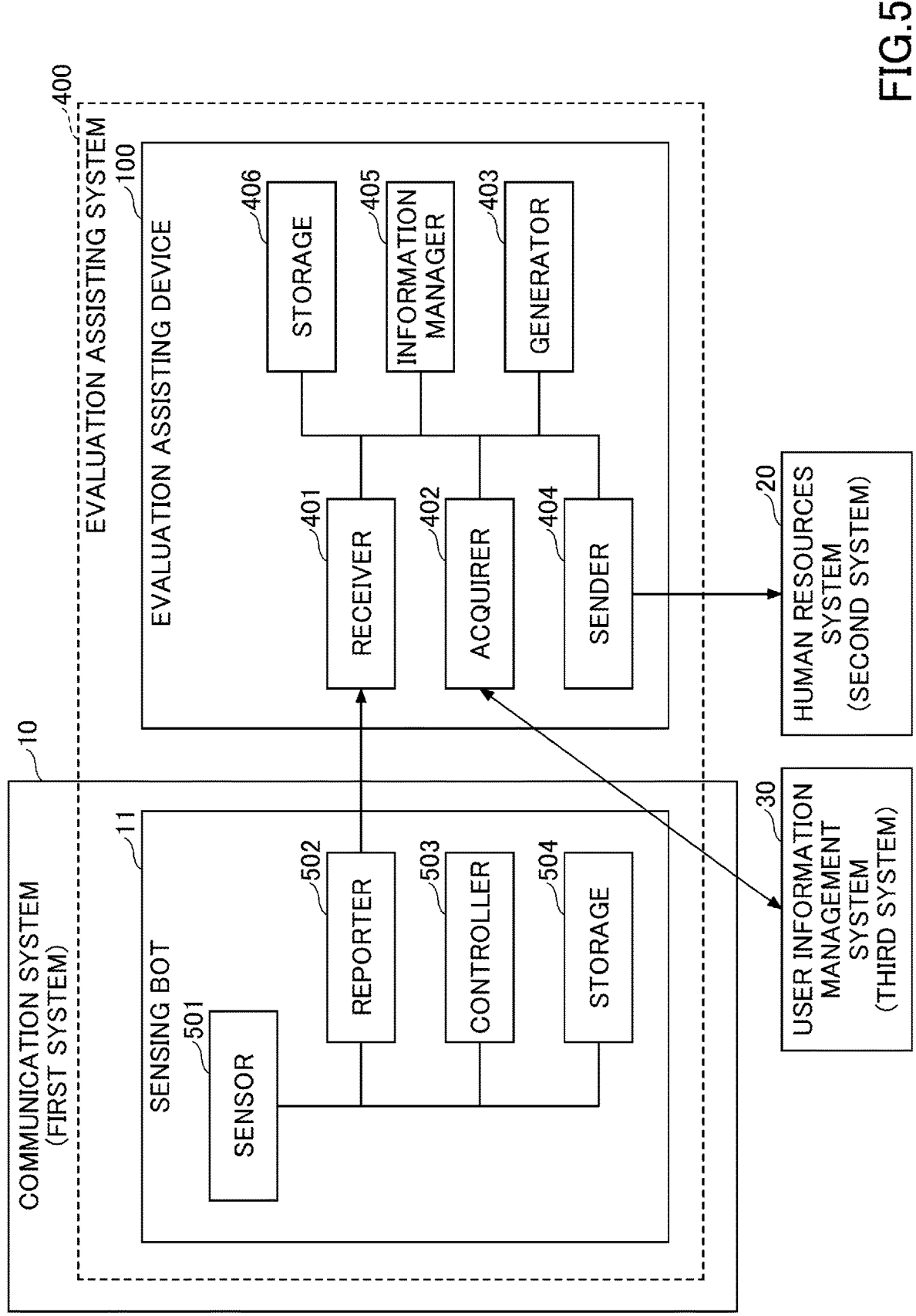
FIG. 5 is a diagram that illustrates another example functional structure of an evaluation assisting system according to one embodiment.

FIG. 5 is a diagram that illustrates another example functional structure of an evaluation assisting system according to one embodiment. If the communication system 10 does not have the functions of the sensing bot 11 described earlier with reference to FIG. 2, the evaluation assisting system 400 can be realized by installing programs for the sensing bot 11 in the communication system 10. In this case, the evaluation assisting system 400 includes an evaluation assisting device 100 and a sensing bot 11, as shown in FIG. 5. This sensing bot 11 is implemented by a program that causes the computer 300, included in the communication system 10, to function as each functional structure of the sensing bot 11 shown in FIG. 5.

(Functional Structure of Sensing Bot)

The sensing bot 11 realizes a sensor 501, a reporter 502, a controller 503, a storage 504, and so forth, by executing programs for the sensing bot 11, on the computer 300 provided in the communication system 10.

In the communication system 10, the sensor 501 executes a sensing process of detecting predetermined communication from the messages sent and received between multiple users. In the example of FIG. 2, the sensor 501 detects a thanks message (an example of predetermined communication) based on the above-described "interpretation of intention" of messages sent and received between user A and user B. Here, the thanks message may be a variety of messages that indicate a sense of appreciation directed to the recipient-user. Note that the thanks message may (or may not) contain thanks points, which is score information to express the feeling of appreciation.

When the sensor 501 senses predetermined communication, the reporter 502 executes a reporting process of reporting communication information that indicates that predetermined communication has been detected, to the evaluation assisting device 100, via the communication network 2. This communication information includes, for example, the thanks message (text data), the sender's user name, the recipient's user name, the thanks points, and the like.

In the event the thanks message detected by the sensor 501 does not contain thanks point information, for example, the controller 503 executes a setting process of setting thanks points in the communication information to be reported from the reporter 502 to the evaluation assisting device 100. Preferably, for example, in the communication system 10, when a thanks message is sent from user A to user B and user B performs a reply operation in response to that, the controller 503 further performs a reply process of automatically sending a return message. Note that the setting process and the reply process performed by the controller 503 will be described later by illustrating specific embodiments.

The storage 504 is realized by, for example, a program executed by the computer 300, the HD 304, the HDD controller 305, the RAM 303, and so forth, and stores various information, including point information which the controller 503 uses when determining the thanks points.

Note that the functional structures of the evaluation assisting system 400 described in FIG. 4 and FIG. 5 are examples. For example, the functional structures included in the evaluation assisting device 100 may be distributed over a plurality of information processing devices.

Also, at least part of the functions of the sensing bot 11 may be provided in the evaluation assisting device 100. For example, the thanks point setting process performed by the controller 503 of the sensing bot 11 may be executed by the evaluation assisting device 100.

Furthermore, at least some of the functions of the evaluation assisting device 100 may be provided in the sensing bot 11. For example, the acquisition process performed by the acquirer 402 of the evaluation assisting device 100 may be performed by the sensing bot 11.

<Process Flow>

Next, the process flow of the evaluation assisting method according to this embodiment will be described.

First Embodiment (Process by the Evaluation Assisting Device)

Figure 6A:
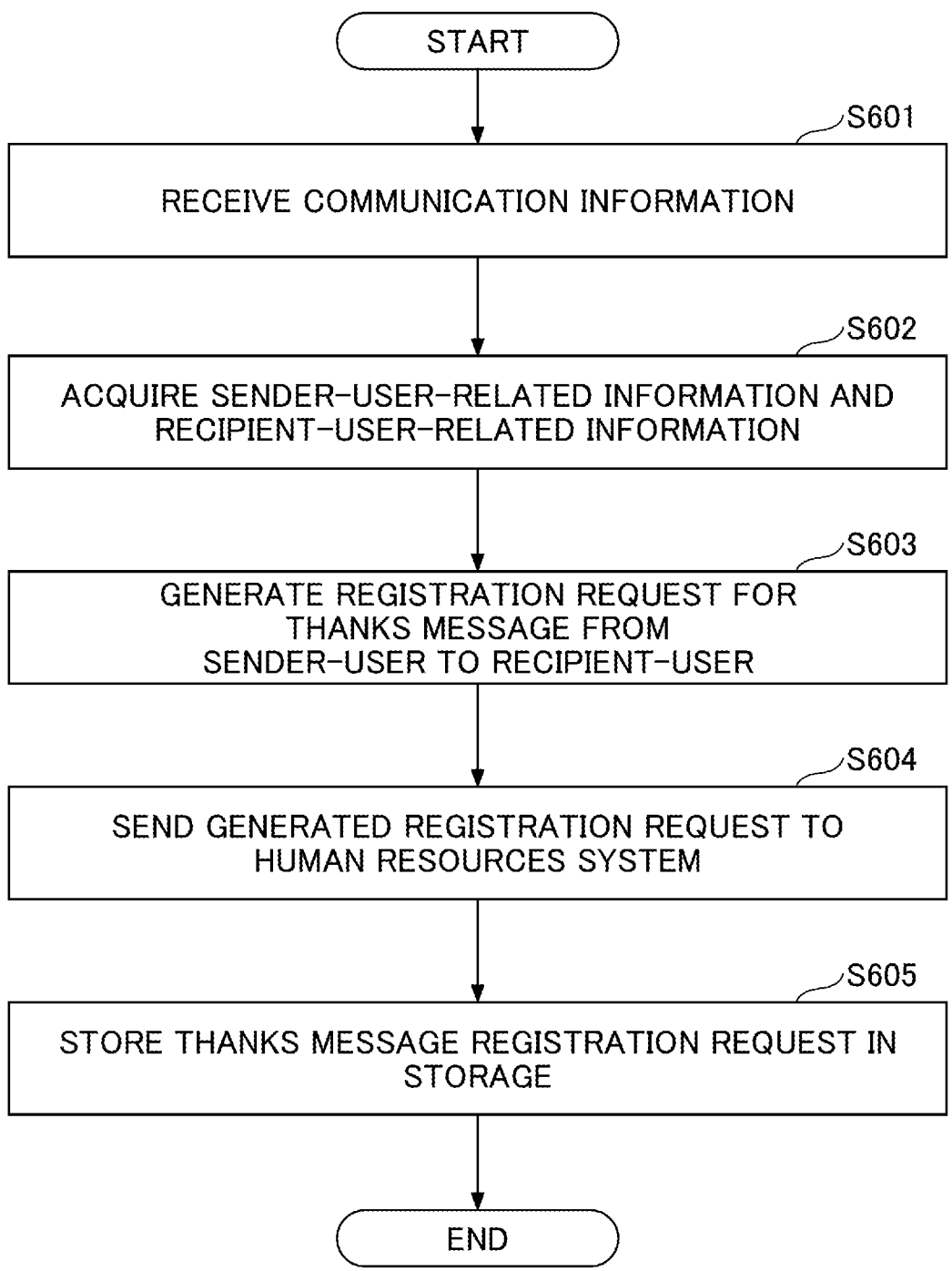
FIGS. 6A and 6B are flowcharts that illustrate example processes by an evaluation assisting device according to a first embodiment.

FIG. 6A is a flowchart that illustrates an example of the process by the evaluation assisting device according to the first embodiment. This process shows, for example, an example of a specific process that is performed by the evaluation assisting device 100 having the functional structures shown in FIG. 4 and FIG. 5.

In step S601, when the receiver 401 receives communication information from the communication system 10 via the communication network 2, the evaluation assisting device 100 executes the process from step S602 onward.

FIG. 7A shows an image of an example of communication information that the communication system 10 sends to the evaluation assisting device 100. In the example of FIG. 7A, the communication information 701a includes, as items, information such as "sender's user name," "recipient's user name," "thanks message," "thanks points," and "system name."

"Sender's user name" is, for example, the user name of the user who sent a thanks message (an example of predetermined communication) detected by the sensing bot 11. Note that the sender's user name is an example of second information for specifying the user who sent the above predetermined communication.

"Recipient's user name" is, for example, the user name of the user who received the thanks message detected by the sensing bot 11. Note that the recipient's user name is an example of the first information for identifying the object of evaluation.

"Thanks message" is a message that is detected by the sensing bot 11, and that expresses, for example, the sender-user's intention to thank the recipient-user.

"Thanks points" is score information that is detected by the sensing bot 11 together with the "thanks message," and that expresses, for example, the degree of the sender-user's appreciation. Note that in the event the sensing bot 11 does not sense thanks points together with the thanks message, the communication information 701a may not include the information of "thanks points."

"System name" is an example of identification information that identifies the communication system 10 that sent the communication information.

FIG. 7B shows an image of another example of communication information that the communication system 10 sends to the evaluation assisting device 100. In the example of FIG. 7B, the communication information 701a includes, as items, information such as "sender's user ID," "recipient's user ID," "thanks message," "thanks points," and "system ID."

"Sender's user ID" is identification information (for example, the employee ID, the login ID, etc.) that identifies the sender-user who sent the thanks message detected by the sensing bot 11. Note that the sender's user ID is another example of second information for specifying the user who sent the above predetermined communication. The second information may be the sender-user's e-mail address or the like.

"Recipient-user ID" is, for example, identification information that identifies the user to whom the thanks message detected by the sensing bot 11 is sent. Note that the recipient-user ID is another example of first information for specifying the object of evaluation. The first information may be the recipient-user's e-mail address or the like.

The "thanks message" and "thanks points" here are the same as the "thanks message" and "thanks points" described with reference to FIG. 7A, and so their description will be omitted here.

"System ID" is, for example, another example of identification information that identifies the communication system 10 that has sent the communication information. Note that the identification information that identifies the communication system 10 may be, for example, address information such as the IP address of the communication system 10.

Here, for example, the following description will assume that the communication information received by the receiver 401 has the format of the communication information 701a shown in FIG. 7A.

Here, referring back to FIG. 6A, the description of the flowchart will be resumed. In step S602, the acquirer 402 acquires sender-user-related information and recipient-user-related information, from the user information management system (third system) 30, based on the communication information received by the receiver 401. For example, the acquirer 402, using the sender's user name "user A" included in the communication information 701a shown in FIG. 7A as a key, acquires the user information 702a of the sender-user, such as that shown in FIG. 7C, from the user information management system 30.

FIG. 7C shows an image of an example of user information that the acquirer 402 acquires from the user information management system 30. In the example of FIG. 7C, the user information 702a includes, as items, information such as "user name," "user ID," "e-mail address," "department," and "position title."

"User name" is the "user name" which the acquirer 402 used as a key when acquiring the user information 702a from the user information management system 30. "User ID" is identification information for, for example, identifying the user in the human resources system 20. "E-mail address" is the user's e-mail address.

"Department" is the name of the department where the user belongs. "Position title" is a name that expresses the user's position title or the like. Note that the department and the position title are examples of the user's organizational information.

Similarly, the acquirer 402, using the recipient's user name "user B" included in the communication information 701a shown in FIG. 7A as a key, acquires the recipient-user's user information from the user information management system 30.

In step S603, the generator 403 generates a request for registering the thanks message from the sender-user to the recipient-user (an example of an evaluation registration request).

FIG. 7D shows an example image of the thanks message registration request generated by the generator 403. In the example of FIG. 7D, the thanks message registration request 703a includes as items, information such as "sender's user ID," "recipient's user ID," "thanks message," and "thanks points."

"Sender's user ID" is, for example, the "user ID" included in the sender-user's user information 702a acquired by the acquirer 402. "Recipient's user ID" is the "user ID" included in the recipient-user's user information acquired by the acquirer 402. "Thanks message" is, for example, the "thanks message" that is included in the communication information 701a shown in FIG. 7A, received by the receiver 401. "Thanks points" are, for example, the "thanks points" included in the communication information 701a shown in FIG. 7A, received by the receiver 401.

FIG. 7E shows an image of another example of a thanks message registration request generated by the generator 403. In the example of FIG. 7E, the registration request 703b of the thanks message includes, as items, information such as "sender-user's e-mail address," "recipient-user's e-mail address," "thanks message," and "thanks points."

"Sender-user's e-mail address" is, for example, the "e-mail address" included in the sender-user's user information 702a acquired by the acquirer 402. "Recipient-user's e-mail address" is the "e-mail address" that is included in the recipient-user's user information acquired by the acquirer 402. "Thanks message" is the "thanks message" included in the communication information received by the receiver 401, as described earlier. "Thanks points" are the "thanks points" included in the communication information received by the receiver 401, as described earlier.

Here, referring back to FIG. 6A again, the description of the flowchart will be resumed. In step S604, the sender 404 sends the thanks message registration request, generated by the generator 403, to the human resources system 20 via the communication network 2.

In step S605, the information manager 405 stores the thanks message registration request generated by the generator 403, or the thanks message registration request, sent from the sender 404 to the human resources system 20, in the storage 406 or the like. For example, the information manager 405 stores a registration request 703a for a thanks message, such as that shown in FIG. 7D, in a memory field corresponding to the communication system 10.

Figure 6B:
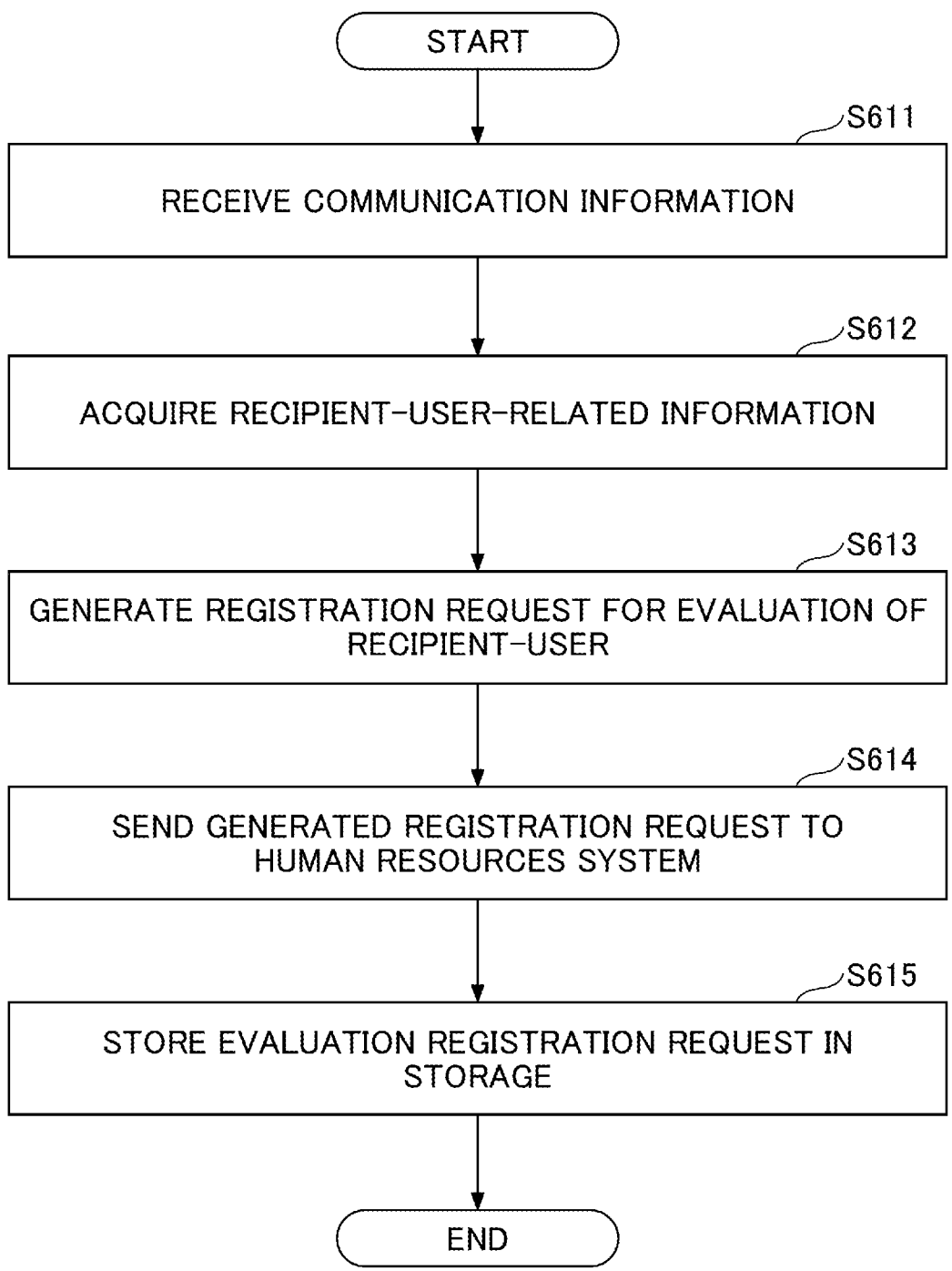

FIG. 6B is a flowchart that illustrates another example of the process by the evaluation assisting device according to the first embodiment. This process shows, for example, another example of a specific process which the evaluation assisting device 100 performs upon receiving the communication information from the communication system 10 in step S3 of FIG. 2.

Although the process of FIG. 6A, for example, has described an example case in which a thanks message from user A to user B is registered with the human resources system 20, the evaluation for the object of evaluation need not include the sender-user's information. In this case, the evaluation assisting device 100 executes, for example, the process shown in FIG. 6B. Note that, since the contents of the following process are basically the same as in the process described above with reference to FIG. 6A, detailed description will be omitted here for the same process as in the process of FIG. 6A.

In step S611, when the receiver 401 receives communication information from the communication system 10 via the communication network 2, the evaluation assisting device 100 executes the process from step S612 onward.

In step S612, the acquirer 402 acquires recipient-user-related information from the user information management system (third system) 30, based on the communication information received by the receiver 401. For example, using the recipient's user name "user B" included in the communication information 701a shown in FIG. 7A as a key, the acquirer 402 acquires the recipient-user's user information from the user information management system 30.

In step S613, the generator 403 generates a request for registering the evaluation of the recipient-user.

FIG. 7F shows an image of an example of the thanks message registration request generated by the generator 403. In the example of FIG. 7F, the thanks message registration request 703c includes, as items, information such as "recipient-user's e-mail address," "thanks message," and "thanks points." In this way, there are cases in which the thanks message registration request 703c may not contain the sender-user's information.

In step S614, the sender 404 sends the thanks message registration request, generated by the generator 403, to the human resources system 20 via the communication network 2.

In step S615, the information manager 405 stores the evaluation registration request generated by the generator 403 or the evaluation registration request sent from the sender 404 to the human resources system 20, in the storage 406 or the like.

(Process by Sensing Bot)

Figure 8:
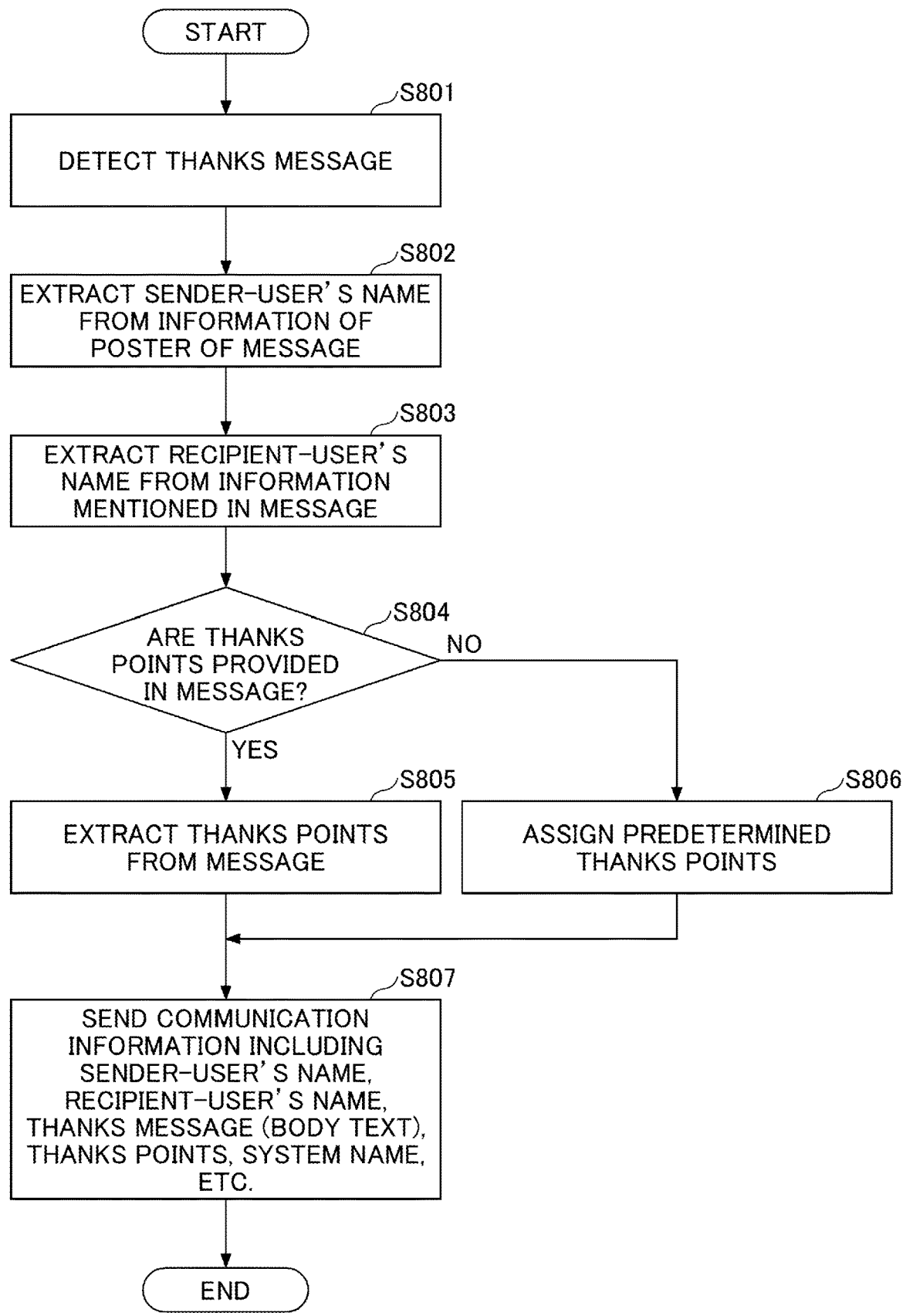
FIG. 8 is a flowchart that illustrates an example process by a sensing bot according to the first embodiment.

FIG. 8 is a flowchart that illustrates an example of the process by the sensing bot according to the first embodiment. This process is an example of a specific process which the sensing bot 11 having the functional structure shown in FIG. 5 performs.

In step S801, when the sensor 501 detects a thanks message (an example of predetermined communication), the sensing bot 11 executes the process from step S802 onward. Note that the sensor 501 detects thanks messages by interpreting the intention of messages sent and received by a plurality of users, as described earlier.

In step S802, the reporter 502 extracts the sender's user name from the information of the poster of the message detected by the sensor 501.

Figure 9:
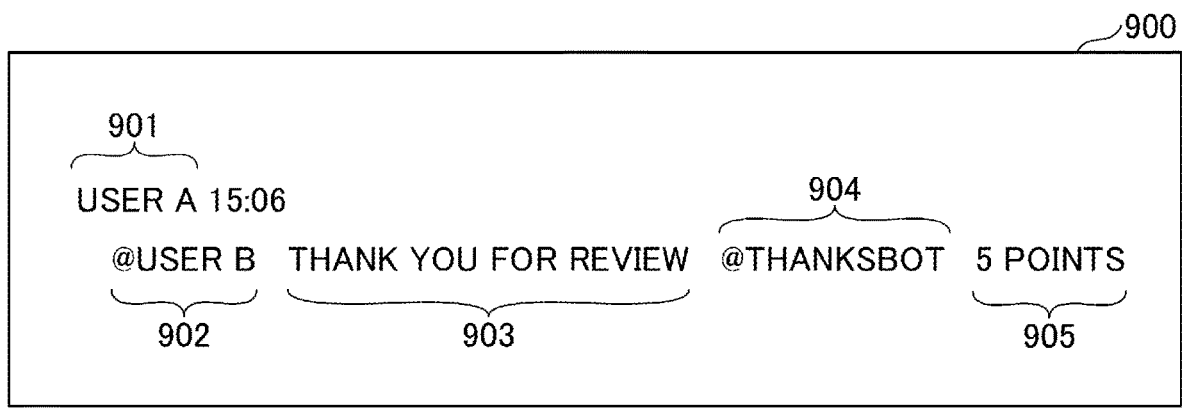
FIG. 9 is a diagram that illustrates an example of a thanks message according to the first embodiment.

FIG. 9 is a diagram that illustrates an example of a thanks message according to the first embodiment. As shown in FIG. 9, a thanks message 900 includes, for example, information such as poster information 901, information 902 of the mentioned person, a thanks message (body text) 903, a mention 904 addressing the evaluation assisting device 100, and thanks points 905.

The poster information 901 includes, for example, the user name of the user (the sender's user name) who posted the thanks message 900. The mentioned person's information 902 includes, for example, the recipient's user name, who is the object of evaluation that the thanks message 900 addresses. The thanks message (body text) 903 includes a character sequence or the like that shows the text of the thanks message 900. The mention 904 addressing the evaluation assisting device 100 includes, for example, a character sequence (here, "ThanksBot") that represents the evaluation assisting device 100 to which the thanks points are sent. The thanks points 905 include, for example, the number of thanks points given to the recipient-user who is the object of evaluation of the thanks message 900.

Here, "mention" refers to the function of sending a notice to a specific recipient in the communication system 10 by entering the recipient's user name, the system, or the like, after the symbol "@."

The reporter 502 acquires, for example, the sender's user name "user A" from the poster information 901 of the thanks message 900 shown in FIG. 9.

In step S803, the reporter 502 extracts the recipient's user name from the information of the person mentioned in the thanks message detected by the sensor 501. For example, the reporter 502 acquires the recipient's user name "user B," from the information 902 of the person mentioned in the thanks message 900 shown in FIG. 9.

In step S804, the reporter 502 determines whether or not thanks points are provided in the thanks message detected by the sensor 501. For example, if the thanks message 900 contains the information of thanks points 905, as in the thanks message 900 shown in FIG. 9, the reporter 502 determines that thanks points are provided in the message. On the other hand, if there is no information of thanks points 905 in the thanks message, the reporter 502 determines that no thanks points are provided in the message.

If thanks points are provided in the message, the reporter 502 shifts the process to step S805. On the other hand, if thanks points are not provided in the message, the reporter 502 shifts the process to step S806.

In step S805, the reporter 502 extracts the thanks points from the thanks message. For example, the reporter 502 acquires the "5 points," provided as thanks points 905, from the thanks message 900 shown in FIG. 9.

Shifting to step S806, the reporter 502 assigns predetermined thanks points (for example, 1 point) to the thanks message detected by the sensor 501.

In step S807, for example, as shown in FIG. 7A, the reporter 502 sends communication information 701a, which includes the sender's user name, the recipient's user name, the thanks message (body text), the thanks points, the system name, and so forth, to the assisting device 100.

(Process by Information Processing System)

Figure 10:
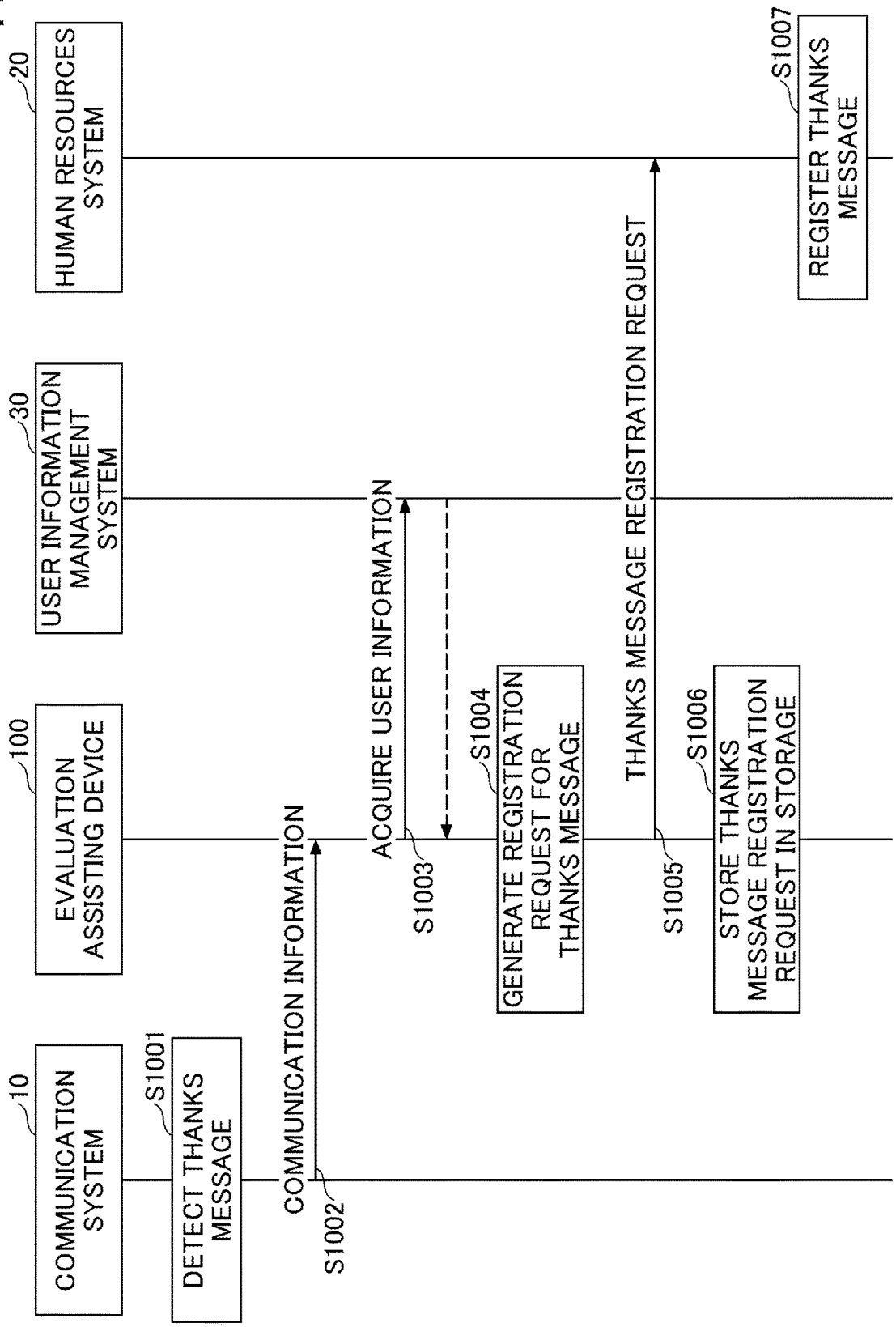
FIG. 10 is a sequence diagram that illustrates an example process by an information processing system according to the first embodiment.

FIG. 10 is a sequence diagram that illustrates an example of the process which the information processing system according to the first embodiment performs. This process shows the overall process flow in the information processing system 1, corresponding to the process by the sensing bot described with reference to FIG. 8 and the process by the evaluation assisting device described with reference to FIG. 6A. Assume that, at the beginning of the process shown in FIG. 10, multiple users are sending and receiving messages by using the communication system 10.

In step S1001, when the sensing bot 11 of the communication system 10 detects a thanks message, the information processing system 1 executes the process from step S1002 onward.

In step S1002, the sensing bot 11, for example, executes the process from step S802 to S807 in FIG. 8, thereby preparing communication information 701a, such as that shown in FIG. 7A, and reporting this to the evaluation assisting device 100. By this means, the receiver 401 of the evaluation assisting device 100 receives communication information 701a from the communication system 10.

In step S1003, the acquirer 402 of the evaluation assisting device 100 acquires user information of the sender-user and the recipient-user from the user information management system (third system) 30, based on the communication information received by the receiver 401. Note that this process corresponds to, for example, the process of step S602 in FIG. 6A.

In step S1004, the generator 403 of the evaluation assisting device 100, for example, generates a registration request 703a for the thanks message such as shown in FIG. 7D, by using the user information acquired by the acquirer 402. Note that this process corresponds to, for example, the process of step S603 in FIG. 6A.

In step S1005, the sender 404 of the evaluation assisting device 100 sends the thanks message registration request, generated by the generator 403, to the human resources system 20. Note that this process corresponds to, for example, the process of step S604 in FIG. 6A.

In step S1006, the information manager 405 of the evaluation assisting device 100 stores the thanks message registration request 703a generated by the generator 403, or the thanks message registration request 703a sent from the sender 404, in the storage 406 or the like. Note that this process corresponds to, for example, the process of step S605 in FIG. 6A.

In step S1007, when the human resources system 20 receives the thanks message registration request sent from the evaluation assisting device 100, the human resources system 20 registers the received thanks message. By this means, the human resources system 20 sends the thanks message from the sender-user to the recipient-user, in the same way as when the sender-user logs in to the human resources system 20 and registers a thanks message addressed to the recipient-user.

Thus, according to the present embodiment, a communication system (first system) 1, which allows communication between a plurality of users, is used so that it becomes possible to easily register the evaluation of the object of evaluation with a human resources system (second system) 20 that manages the evaluations of objects of evaluation.

Second Embodiment

According to the first embodiment, user A uses the communication system 10 to send, for example, a thanks message 900 such as that shown in FIG. 9 to user B, so that a thanks message can be sent to user B in the human resources system 20.

However, according to this method alone, user B, who has received a thanks message from user A in the human resources system 20, is unable to reply to the thanks message in the human resources system 20 unless user B logs in to the human resources system 20.

In view of this, the second embodiment is designed so that, when user B receives a thanks message from user A, user B can reply to the thanks message from user A with ease, in the human resources system 20, by using the communication system 10.

<Process Flow>

(Process by the Sensing Bot)

Figure 11:
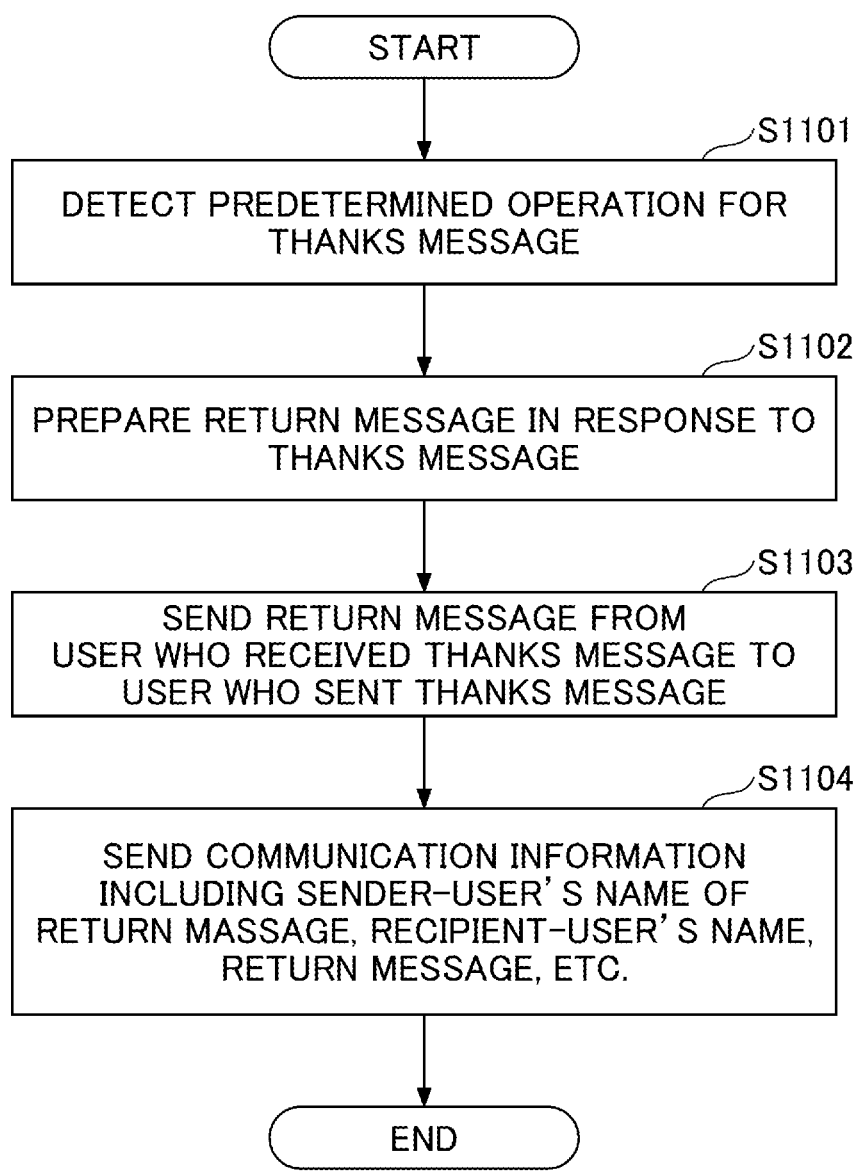
FIG. 11 is a flowchart that illustrates an example process by a sensing bot according to a second embodiment.

FIG. 11 is a flowchart that illustrates an example of the process by the sensing bot according to the second embodiment. Assume that, at the beginning of the process of FIG. 11, a thanks message 900 such as that shown in FIG. 9 has already been sent from user A to user B through the process by the information processing system described with reference to FIG. 10. Also assume that, by this means, for example, a thanks message 1210 such as that shown in FIG. 12 is displayed on the chat screen 1200 of the information terminal 40b used by user B.

Figure 12:
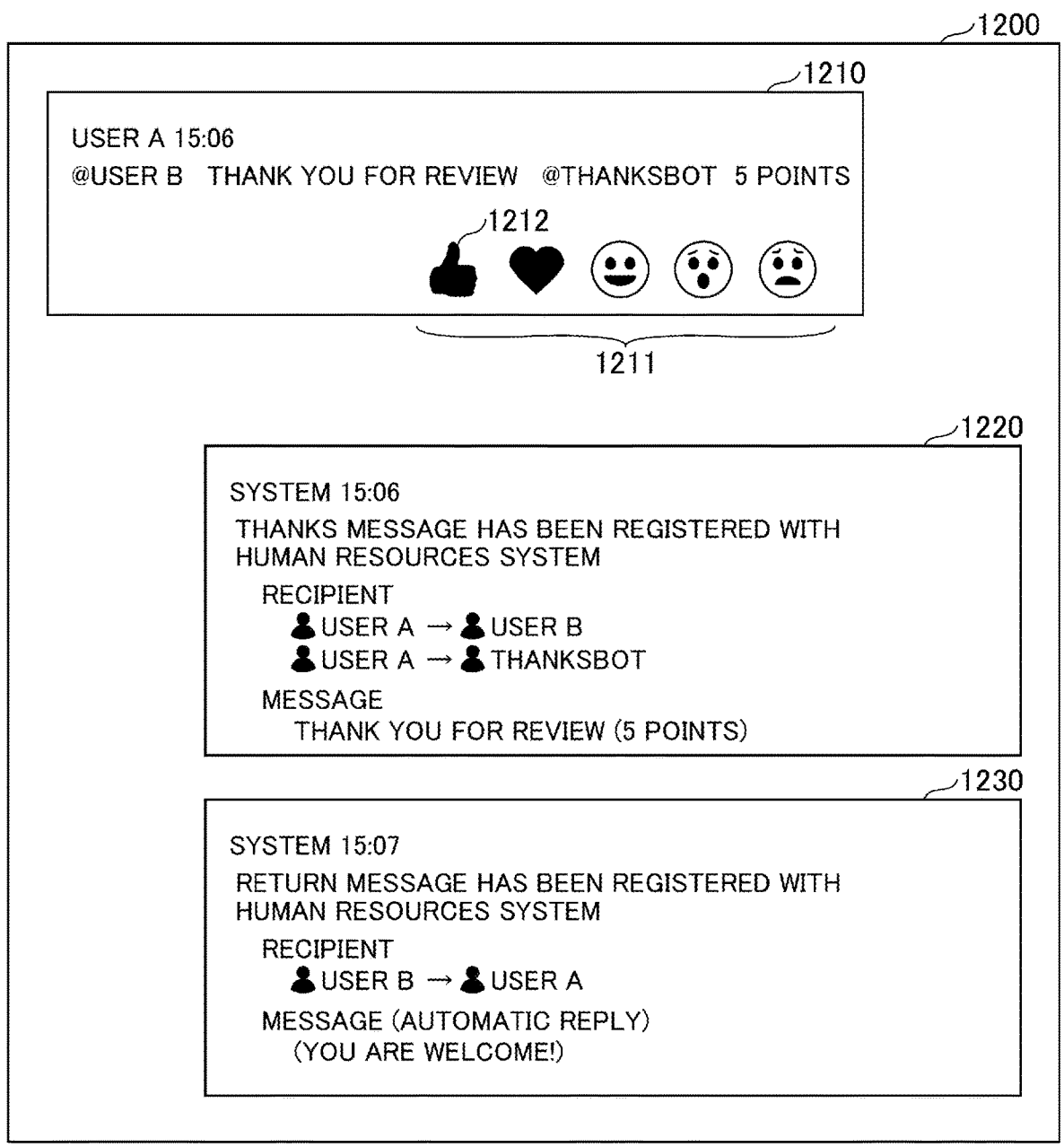
FIG. 12 is a diagram that illustrates an example of a display screen according to the second embodiment.

At this time, as shown in FIG. 12, the sensing bot 11 may display a message 1220, which indicates that the thanks message has been registered with the human resources system 20, on the chat screens of the information terminals 40a and 40b.

Referring to step S1101 of FIG. 11, when user B detects a predetermined operation with respect to the thanks message 1210 received from user A, the sensing bot 11 executes the process from step S1102 onward.

For example, as shown in FIG. 12, assume that, in the thanks message 1210 received by user B, one or more operation buttons 1211 for responding to the thanks message are displayed, in addition to the content of the thanks message 900 sent by user A. Also, assume that user B can perform an affirmative reply operation in response to the thanks message 1210 by selecting the first button 1212 among the operation buttons 1211.

In this case, the sensor 501 of the sensing bot 11 detects the operation of selecting the first button 1212 as a predetermined operation in response to the thanks message 1210.

In step S1102, when the sensor 501 detects a predetermined operation with respect to the thanks message 1210, the controller 503 of the sensing bot 11 prepares a return message in response to the thanks message 1210. For example, when there is a thanks message "Thank you for the review" from user A, the sensing bot 11 may apply chatbot technology to prepare a return message such as "You are welcome!".

In step S1103, the controller 503 of the sensing bot 11 sends back the prepared return message from user B who received the thanks message 1210, to the user A who sent the thanks message.

By this means, on the chat screens of the information terminals 40*a* and 40*b*, for example, as shown in FIG. 12, a message 1230 to indicate that a return message has been automatically sent from user B to user A is displayed.

In step S1104, the reporter 502 of the sensing bot 11 sends communication information indicating that a return message has been returned, to the evaluation assisting device 100, via the communication network 2. This communication information includes, for example, the sender's user name (user B) of the returned message, the recipient's user name (user A), the return message "You are welcome!" and so forth.

(Process by the Evaluation Assisting Device)

Figure 13:
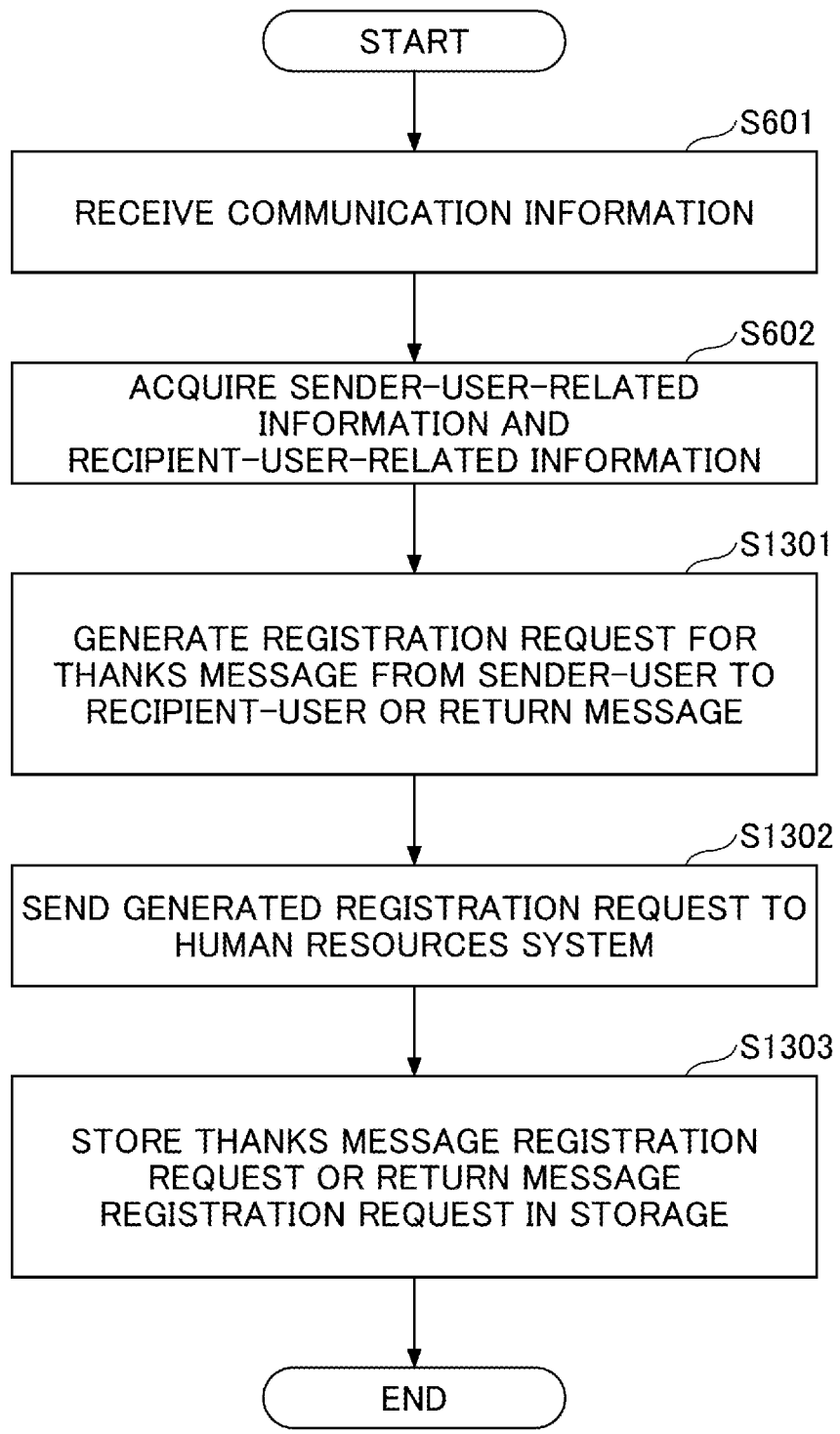
FIG. 13 is a flowchart that illustrates an example process by an evaluation assisting device according to the second embodiment.

FIG. 13 is a flowchart that illustrates an example of the process by the evaluation assisting device according to the second embodiment. This process shows an example of the process by the evaluation assisting device 100, and corresponds to the process by the sensing bot described with reference to FIG. 11. Note that, in the process shown in FIG. 13, the process of steps S601 and S602 is the same as the process by the evaluation assisting device 100 according to the first embodiment described with reference to FIG. 6A, and so the description will be omitted here.

In step S1301, the generator 403 generates a request for registering a thanks message or a return message from the sender-user to the recipient-user.

FIG. 14A shows an image of an example of the communication information which the communication system 10 sends to the evaluation assisting device 100 in step S1104 of FIG. 11. In the example of FIG. 14A, the communication information 1401 includes, as items, information such as "sender's user name," "recipient's user name," "return message," and "system name."

"Sender's user name" is the user name of the user who sent the return message (for example, user B). "Recipient's user name" is the user name of the recipient-user to whom the return message is sent (for example, user A).

"Return message" is, for example, a return message to the recipient-user (for example, user A), prepared by the sensing bot 11. "System name" is an example of identification information that identifies the communication system 10 that has sent the communication information.

In this way, the communication information 1401 that the communication system 10 sends to the evaluation assisting device 100 in step S1104 of FIG. 11 may not (or may) contain "thanks points."

When the communication information received by the receiver 401 includes a "return message," the generator 403, for example, generates a registration request 1402 for the return message, including the "return message," as shown in FIG. 14B. On the other hand, when the communication information received by the receiver 401 includes a "thanks message," the generator 403, for example, generates a registration request 703 for the thanks message, including the "thanks message," as shown in FIG. 7D.

In step S1302, the sender 404 sends the registration request, generated by the generator 403, to the human resources system 20.

In step S1303, the information manager 405 stores the registration request for the thanks message or the return message generated by the generator 403, or stores the registration request for the thanks message or the return message sent from the sender 404 to the human resources system 20, in the storage 406 or the like.

According to the above process, when, for example, user B receives a thanks message 1210 such as that shown in FIG. 12 from user A, user B can send a reply to the thanks message 1210 with ease, simply by selecting the first button 1212 displayed with the thanks message 1210.

Thus, according to the second embodiment, when user B receives a thanks message from user A, user B can reply to the thanks message received from user A, with ease, in the human resources system 20, by using the communication system 10.

Third Embodiment

For example, in step S804 of FIG. 8, if thanks points are not provided in the thanks message detected by the sensor 501, the sensing bot 11 according to the first embodiment assigns predetermined thanks points (for example, 1 point) in step S806.

However, this is just an example, and the sensing bot 11 may change the thanks points to assign to a thanks message detected by the sensor 501 depending on, for example, the communication system 10 in which the thanks message is detected. Also, during a predetermined campaign period or the like, the sensing bot 11 may multiply the thanks points by a different point-multiplying factor than usual, and assign a different amount of thanks points to a thanks message detected by the sensor 501. Furthermore, the sensing bot 11 may give additional thanks points depending on, for example, predetermined keywords included in the thanks message.

<Functional Structure>

Figure 15:
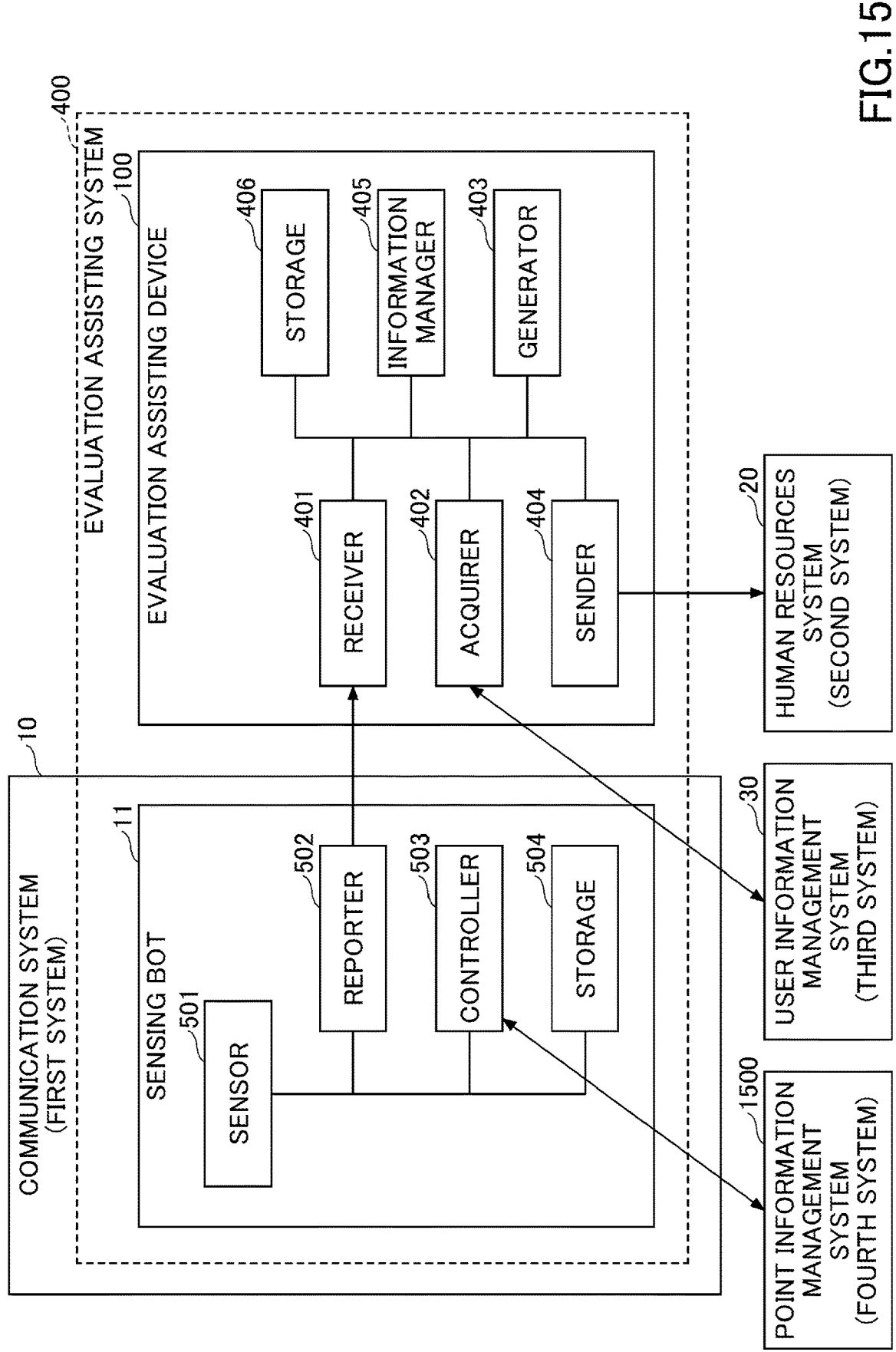
FIG. 15 is a diagram that illustrates an example functional structure of an evaluation assisting system according to a third embodiment.

FIG. 15 is a diagram that illustrates an example functional structure of an evaluation assisting system according to the third embodiment. As shown in FIG. 15, the controller 503 of the sensing bot 11 according to the third embodiment is configured to acquire point information, which will be described later, from a point information management system (fourth system) 1500.

The point information management system (fourth system) 1500 is, for example, an information processing device having a configuration of a computer 300, or a system including a plurality of computers 300, and is communicably connected with the communication system 10 via the communication network 2.

The point information management system 1500 stores and manages point information 1601, 1602, and 1603, such as the point information shown in FIGS. 16A, 16B, and 16C, and provides the point information 1601, 1602, and 1603 in response to requests from the control point 503 or the like.

FIG. 16A shows an example of point information according to the third embodiment. In the example of FIG. 16A, in the point information 1601, the system IDs of a plurality of communication systems 10 (SYSTEM01, SYSTEM02, etc.) and their respective point-multiplying factors are associated and stored with each other. Note that the point-multiplying factors may be additional points or the like.

Referring to the example of FIG. 16A, if the system ID of the communication system 10 in which the sensing bot 11 is installed is "SYSTEM01," the controller 503 assigns the thanks points by doubling the predetermined thanks points (for example, 1 point). On the other hand, if the system ID of the communication system 10 in which the sensing bot 11 is installed is "SYSTEM02," the controller 503 assigns the thanks points by multiplying the predetermined thanks points by 1. Using such point information 1601, the controller 503 of the sensing bot 11 can apply weights to a plurality of communication systems 10 and set thanks messages with thanks points.

FIG. 16B shows another example of point information according to the third embodiment. Referring to the example of FIG. 16B, in the point information 1602, a plurality of periods and their respective point-multiplying factors are associated and stored with each other. Note that the point-multiplying factors may be additional points or the like.

In the example of FIG. 16B, if the current date is in the period from March 1 to May 10, the controller 503 gives thanks points by multiplying the predetermined thanks points (for example, 1 point) by 3. On the other hand, if the current date is not in the above period, the controller 503 gives thanks points by multiplying the predetermined thanks points by 1. Using such point information 1602, the controller 503 of the sensing bot 11 can set a thanks message with a greater amount of points during, for example, a campaign period.

FIG. 16C shows another example of point information according to the third embodiment. Referring to the example of FIG. 16C, in the point information 1603, a plurality of keywords and their respective additional points are associated and stored with each other. Note that the additional points may be point-multiplying factors or the like.

In the example of FIG. 16C, if a thanks message contains a keyword 1, the controller 503 adds 2 additional points to the predetermined thanks points (for example, 1 point). Similarly, if a thanks message contains a keyword 2, the controller 503 adds 1 additional point to the predetermined thanks points. Using such point information 1603, the controller 503 of the sensing bot 11 can set thanks messages with thanks points by, for example, applying weights to the keywords included in the thanks messages.

<Process Flow>

Figure 17:
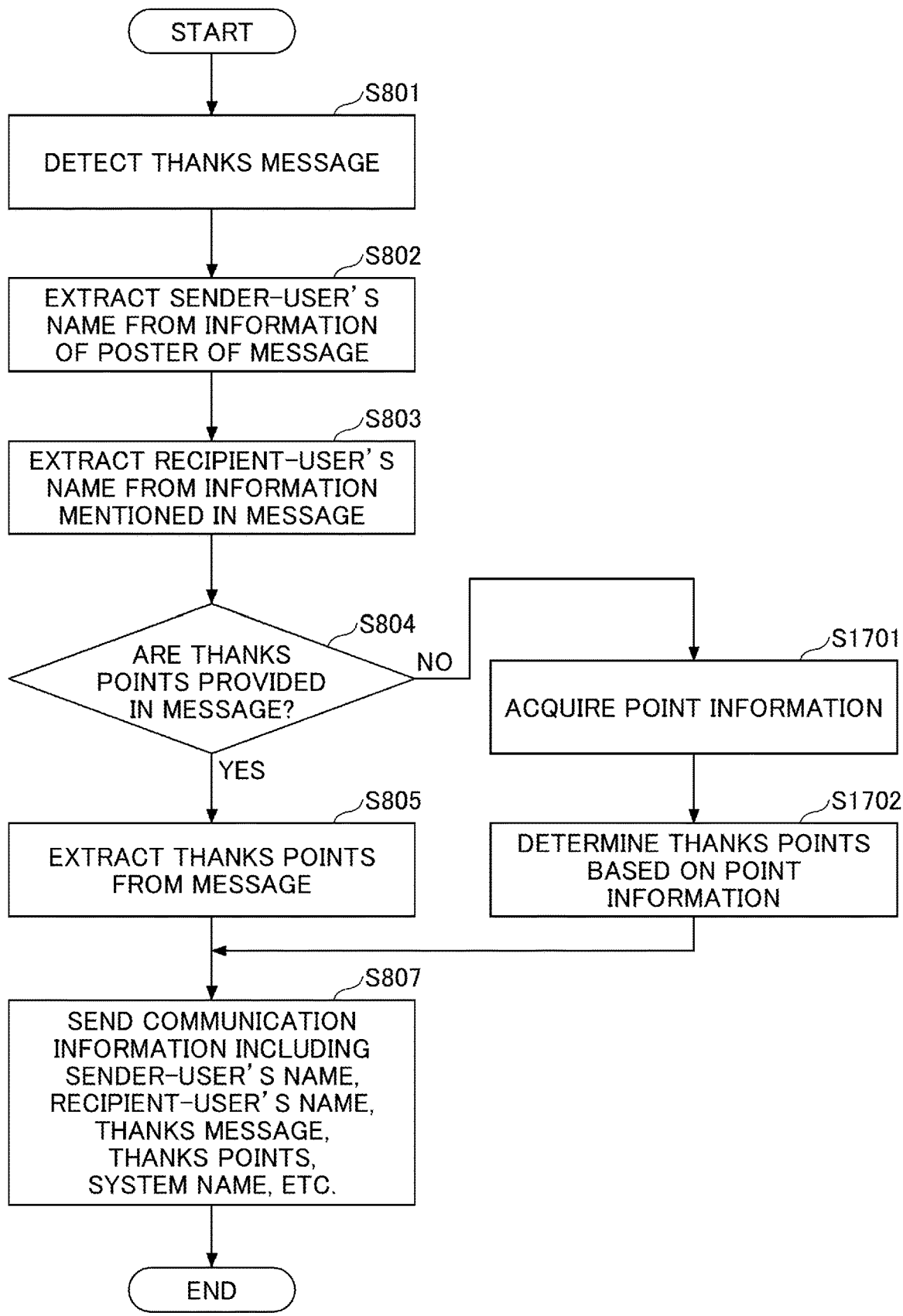
FIG. 17 is a flowchart that illustrates an example process by a sensing bot according to the third embodiment.

FIG. 17 is a flowchart that illustrates an example of the process by the sensing bot according to the third embodiment. Note that, in the process shown in FIG. 17, the process of steps S801 to S805 and S807 are the same as the process by the sensing bot according to the first embodiment described earlier with reference to FIG. 8, and so their description will be omitted here.

When the process shifts from step S804 to step S1701, the controller 503 of the sensing bot 11 acquires one or more of the point information 1601, 1602, and 1603 described with reference to FIG. 16, from the point information management system 1500. Note that the point information provided by the sensing bot 11 of the communication system 10 is configured in advance in the point information management system 1500.

In step S1702, the controller 503 of the sensing bot 11 determines the thanks points to assign to the thanks message based on one or more pieces of point information acquired.

For example, assume that the controller 503 acquires the point information 1601 and the point information 1603 from the point information management system 1500. Also, assume that the thanks message includes "keyword 1," and the system ID of the communication system 10 including the sensing bot 11 is "SYSTEM01."

In this case, the controller 503 determines that the thanks points are 4 points. That is, the predetermined thanks point "1 point" is doubled to 2 points based on the point information 1601, and 2 more additional points are added to these 2 points based on the point information 1603.

According to the above process, even if thanks points are not provided in the thanks message detected by the sensor 501, the sensing bot 11 can set the thanks message with thanks points according to the point information obtained from the point information management system 1500.

Also, according to this embodiment, when changing the weighting of thanks points or changing the campaign period, it is only necessary to change the point information that the user information management system 30 manages, and there is no need to update the sensing bot 11 of the communication system 10.

Fourth Embodiment

The evaluation assisting device 100 has an information providing function for introducing, for example, the status of use of services provided by the evaluation assisting device 100, based on registration requests for thanks messages (an example of a registration request for evaluation) stored in the storage 406 or the like. The information providing function of the evaluation assisting device 100 will be described below with the fifth embodiment.

<Functional Structure>

Figure 18:
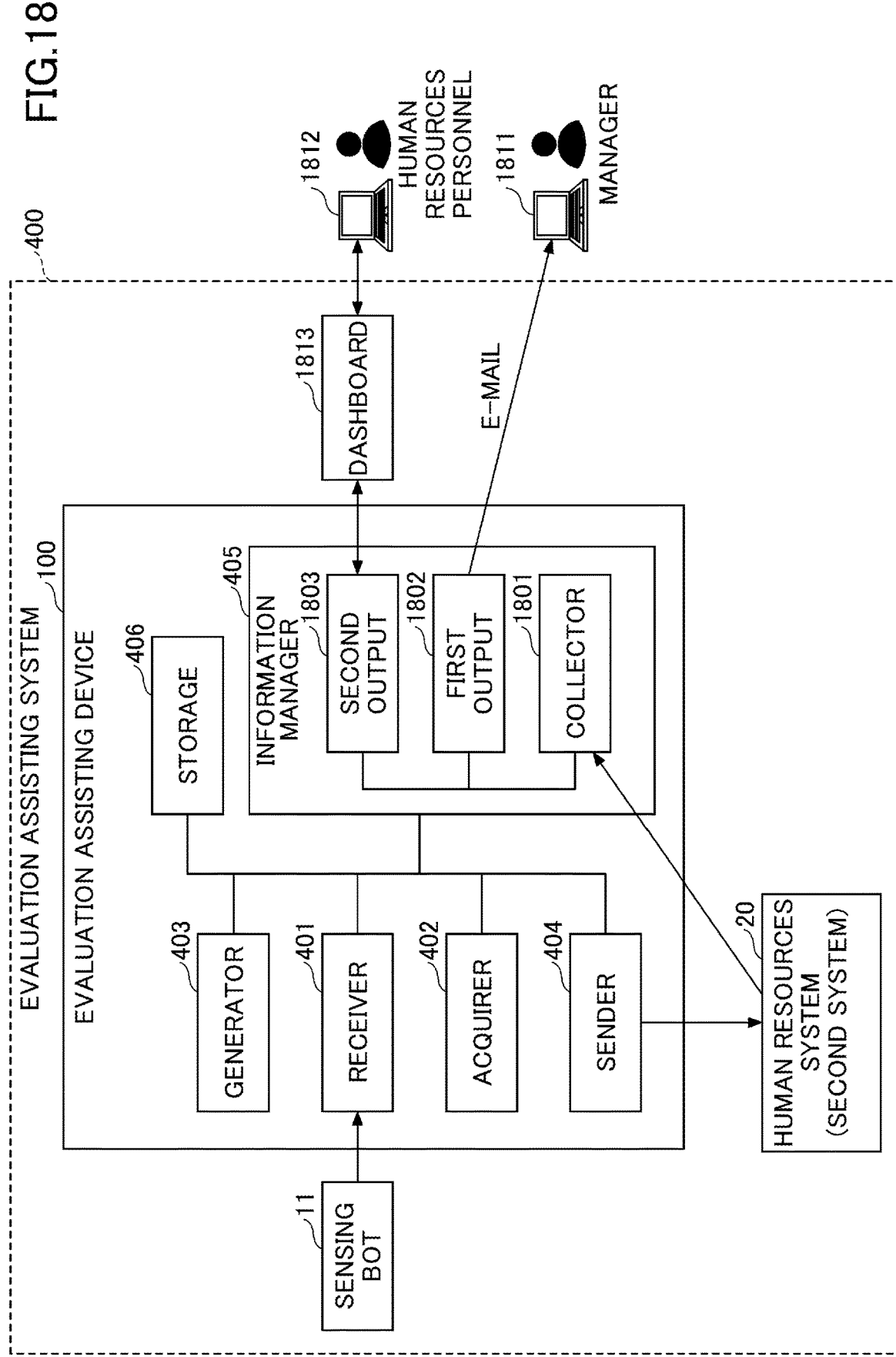
FIG. 18 is a diagram that illustrates an example functional structure of an evaluation assisting system according to a fourth embodiment.

FIG. 18 is a diagram that illustrates an example functional structure of the evaluation assisting system according to the fourth embodiment. The information manager 405 of the evaluation assisting device 100 according to the fourth embodiment has a collector 1801, a first output 1802, a second output 1803, and so forth, in addition to the functions described in the first to third embodiments. Note that, in FIG. 18, the sensing bot 11 has, for example, the same functional structure as the sensing bot 11 according to the first embodiment shown in FIG. 5.

The collector 1801 is implemented by, for example, a program executed by the CPU 301, and collects, from the human resources system 20, the history of thanks messages sent from the human resources system (second system) 20 in response to requests from the evaluation assisting device 100. Also, the collector 1801 acquires, from the storage 406 or the like, the history of thanks message registration requests sent from the sender 404 to the human resources system 20.

In a preferred example, the generator 403 according to the third embodiment may have a function of adding, to the thanks message (body text) included in a thanks message registration request to be sent to the human resources system 20, identification information that identifies that the registration request is from the evaluation assisting system 400. For example, the generator 403 adds a predetermined character sequence, to the thanks message (body text), as identification information to indicate that it is a registration request from the evaluation assisting system 400.

By this means, the collector 1801 can selectively collect the history of thanks messages sent in response to requests from the evaluation assisting device 100, by using the predetermined character sequence added to the thanks message as a key, from the history of thanks messages sent from the human resources system 20.

Alternatively, the collector 1801 may collect the history of thanks messages sent from the human resources system 20, and selectively acquire the history of thanks messages sent without a predetermined character sequence, from the collected history of thanks messages.

The first output 1802 is realized by, for example, a program executed by the CPU 301, and, based on the transmission history of thanks message registration requests, stored in the storage 406 or the like, outputs a report about the users (the object of evaluation) managed under the human resources system 20. For example, the first output 1802 prepares a report that analyzes the status of use of thanks messages on a per user basis, based on histories and the like collected by the collector 1801, and sends the prepared report to an information terminal 1811 or the like that is used by the manager and so forth, by e-mail or the like.

The second output 1803 is, for example, realized by a program executed by the CPU 301, and outputs a report that shows the status of use of the evaluation assisting system 400, based on the transmission history of thanks message registration requests, stored in the storage 406 or the like. Note that the second output 1803 may output a report to indicate the status of use of the evaluation assisting system 400 based on the reception history of communication information, stored in the storage 406 or the like. Note that the first output 1802 and the second output 1803 may be different outputs or the same output.

Also, the second output 1803 may output a report to show the status of use of the evaluation assisting system 400 to an information terminal 1812 that is used by human resources personnel and so forth, via a dashboard 1813 or the like, as shown in FIG. 18. Here, the dashboard 1813 is a data visualization tool that summarizes various data in graphs, tables, or the like, for easy understanding. The dashboard 1813 may be, for example, a unique program for each team/group such as a company, or may be a general-purpose program such as Microsoft Power BI (registered trademark).

Note that the second output 1803 may output a report to show the status of use of the evaluation assisting system 400 to the information terminal 1812 that is used by human resources personnel and so forth, without using the dashboard 1813.

<Process Flow>
(Process by the Evaluation Assisting Device)

Figure 19:
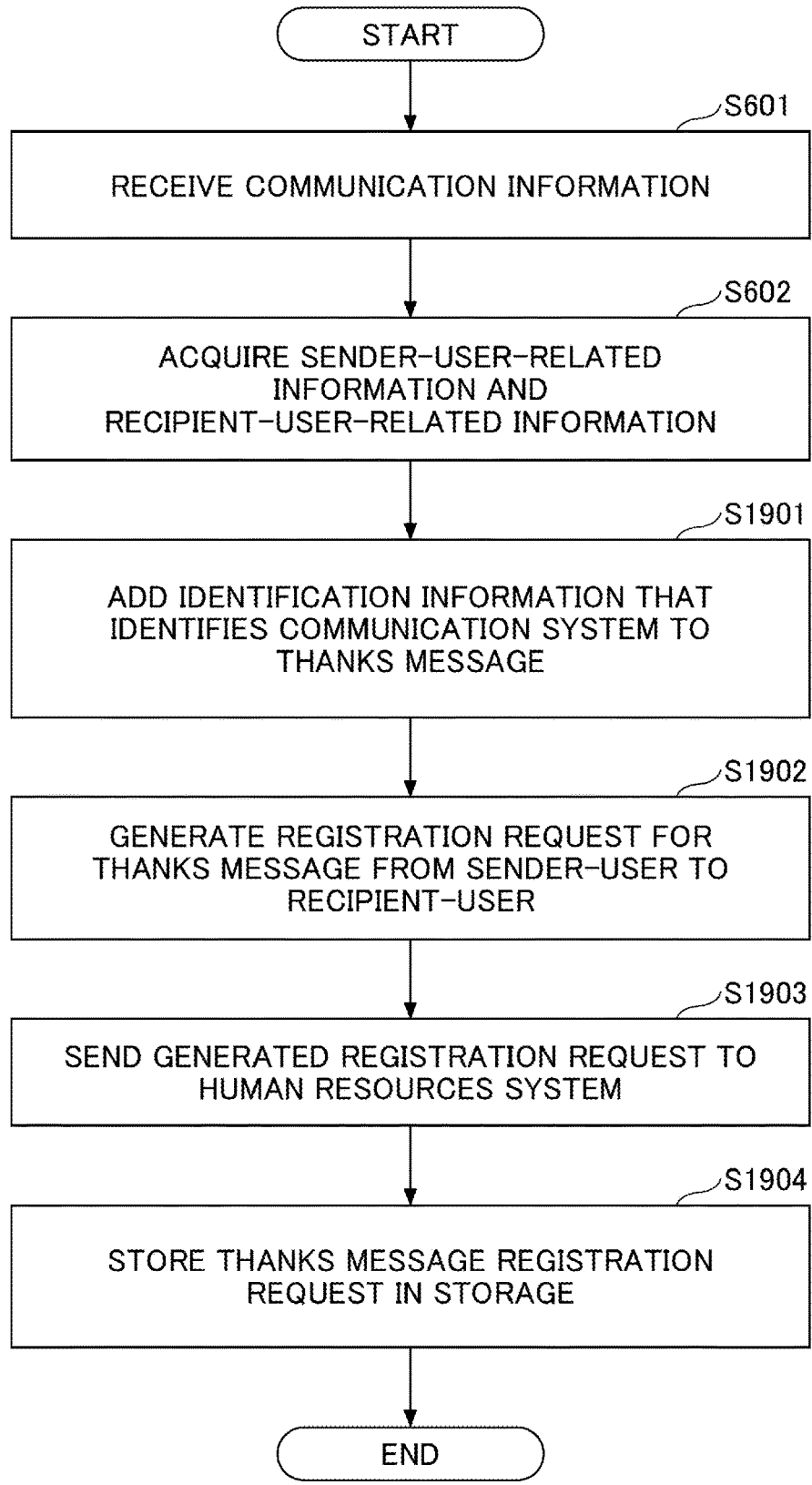
FIG. 19 is a flowchart that illustrates an example process by an evaluation assisting device according to the fourth embodiment.

FIG. 19 is a flowchart that illustrates an example of the process by the evaluation assisting device according to the fourth embodiment. Note that, in the process shown in FIG. 19, the process of steps S601 and S602 is the same as the process by the evaluation assisting device according to the first embodiment described with reference to FIG. 6A, and so the description will be omitted here. Also, since the details of the process are basically the same as in the process by the evaluation assisting device according to the first embodiment described with reference to FIG. 6A, the same details of the process as in the first embodiment will be omitted here.

In step S1901, the generator 403 of the evaluation assisting device 100 adds identification information that identifies the communication system 10, to the thanks message included in the communication information received from the communication system 10.

For example, if the received communication information includes a thanks message such as the thanks message 2010 shown in FIG. 20A, the generator 403 adds a character sequence 2021 that identifies the communication system 10, to the end of the thanks message, as shown in FIG. 20B. FIG. 20B illustrates an example in which the generator 403 prepares a thanks message 2020, to which the character sequence "thanks" is added as the character sequence 2021 to identify the communication system 10.

In step S1902, the generator 403 generates a request for registering the thanks message from the sender-user to the recipient-user.

In step S1903, the sender 404 sends the registration request generated by the generator 403 to the human resources system 20 via the communication network 2. This thanks message registration request includes, for example, the thanks message 2020, to which the character sequence 2021 identifying the communication system 10 is added.

In step S1904, the information manager 405 stores the thanks message registration request generated by the generator 403 or the thanks message registration request sent from the sender 404 to the human resources system 20, in the storage 406 or the like.

(Information Providing Process 1)

Figure 21A:
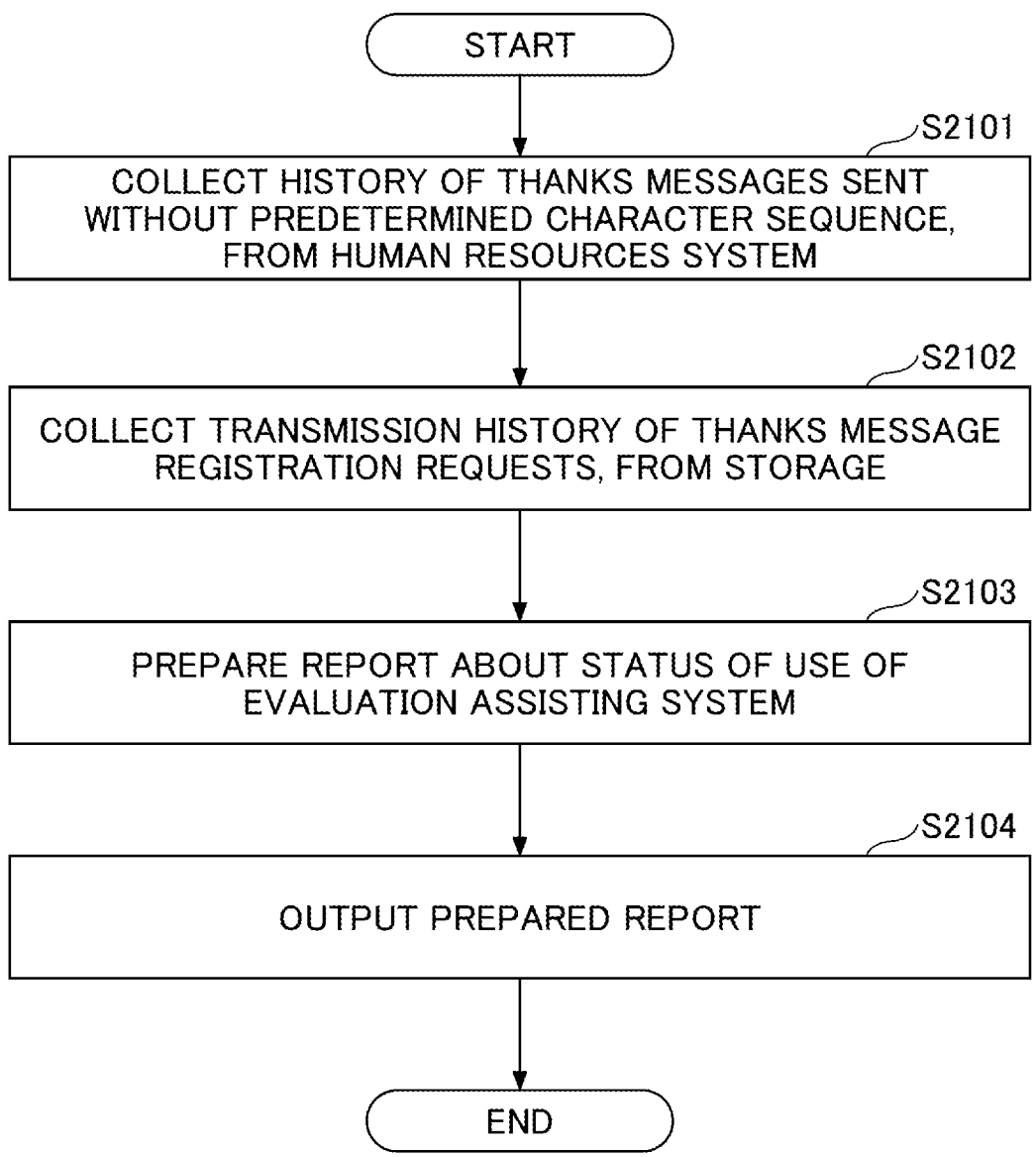

FIG. 21A shows an example of the information providing process according to the fourth embodiment. This process shows an example of the information providing process performed by the information manager 405 in response to a request from the information terminal 1812 used by human resources personnel or the like.

In step S2101, the collector 1801 collects, from the human resources system 20, the history of thanks messages sent without the character sequence 2021 (hereinafter referred to as "predetermined character sequence") identifying the communication system 10. For example, the collector 1801 may send a request, to the human resources system 20, for acquiring the history of thanks messages sent without the predetermined character sequence, and thus acquire the history of thanks messages sent without the predetermined character sequence.

Alternatively, the collector 1801 may acquire the reception history of thanks messages from the human resources system 20, and selectively acquire the history of thanks messages sent without the predetermined character sequence, from the acquired reception history of thanks messages.

In step S2102, the collector 1801 acquires the transmission history of thanks message registration requests, stored in the storage 406 or the like.

In step S2103, the second output 1803 prepares a report about the status of use of the evaluation assisting system 400 based on the information collected by the collector 1801.

In step S2104, the second output 1803 outputs the prepared report to, for example, the dashboard 1813, the information terminal 1812, or the like.

FIG. 22A shows examples of information provided by the evaluation assisting device 100. For example, in step S2104 of FIG. 21A, the second output 1803 may output a graph 2210, such as that shown in FIG. 22A, to the dashboard 1813, the information terminal 1812, or the like.

In the graph 2210 shown in FIG. 22A, the horizontal axis represents the time (in days) past since the introduction of the evaluation assisting system 400, and the vertical axis represents the number of times thanks messages have been sent. Also, the graph 2210 shows the number of times 2211 thanks messages have been sent by using the communication system 10 and the number of times 2212 thanks messages have been sent by using the human resources system 20, in the company (whole company) where the human resources system 20 is used. From this graph, human resources personnel can easily see, for example, that the number of times thanks messages are sent has been increasing since the introduction of the evaluation assisting system 400, and that more thanks messages are sent by using the communication system 10.

Note that the second output 1803 may, for example, study the transmission histories of thanks messages, which the collector 1801 collected from the storage 406 or the like in step S2101, and show, in a graph, the number of times 2211 thanks messages have been sent by using the communication system 10. Also, the second output 1803 may, for example, compute the transmission history of thanks messages, which the collector 1801 collected from the human resources system 20 in step S2101, and show, in a graph, the number of times 2212 thanks messages have been sent by using the human resources system 20.

Figure 22B:
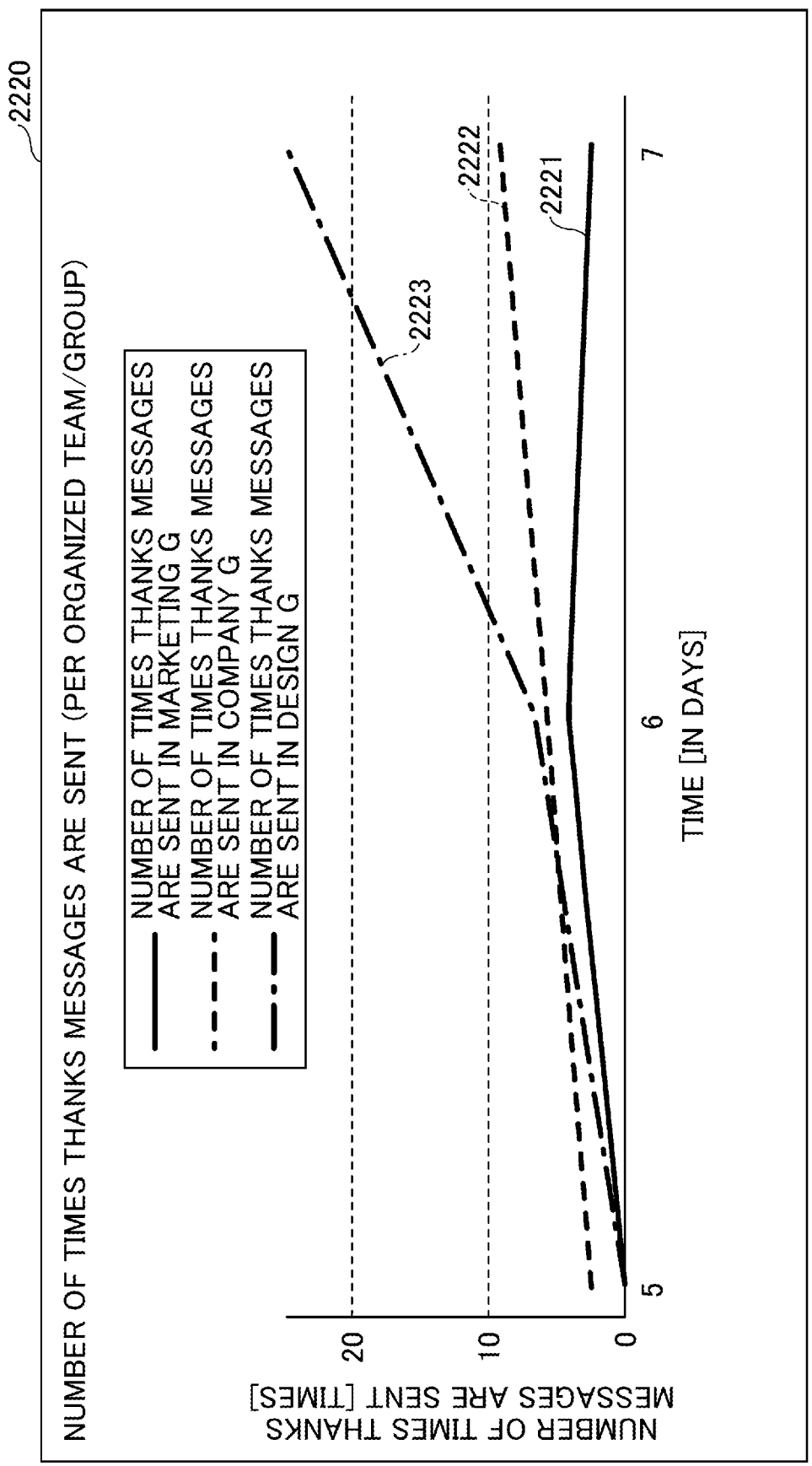

FIG. 22B shows other examples of information provided by the evaluation assisting device 100. For example, in step S2104 of FIG. 21A, the second output 1803 may output a graph 2220, such as that shown in FIG. 22B, to the dashboard 1813, the information terminal 1812, or the like.

In the graph 2220 shown in FIG. 22B, the horizontal axis represents the time (in days) past since the introduction of the evaluation assisting system 400, and the vertical axis represents the number of times thanks messages have been sent. Also, the graph 2220 shows the numbers of times, namely 2221, 2222, and 2223, thanks messages have been sent per organized team/group. For example, from the graph 2220 shown in FIG. 22B, human resources personnel or the like can easily see that the number of thanks messages 2223 that are sent from the design group has been increasing, that the number of thanks messages 2221 that are sent from the marketing group has not increased, and so forth. Also, from this graph 2220, human resources personnel and the like can judge, for example, that the reason the number of times thanks messages are sent in the marketing G is small may be found out by comparing it to the case of the design group.

Note that the second output 1803 acquires the senders' user IDs and so forth, included in the transmission histories of thanks messages collected by the collector 1801, and, using the acquired senders/users' IDs, acquires information about the departments of the senders/users from the user information management system 30. By this means, the second output 1803 can study the transmission histories of thanks messages collected by the collector 1801, per organized team/group, and graph them.

Figure 23A:
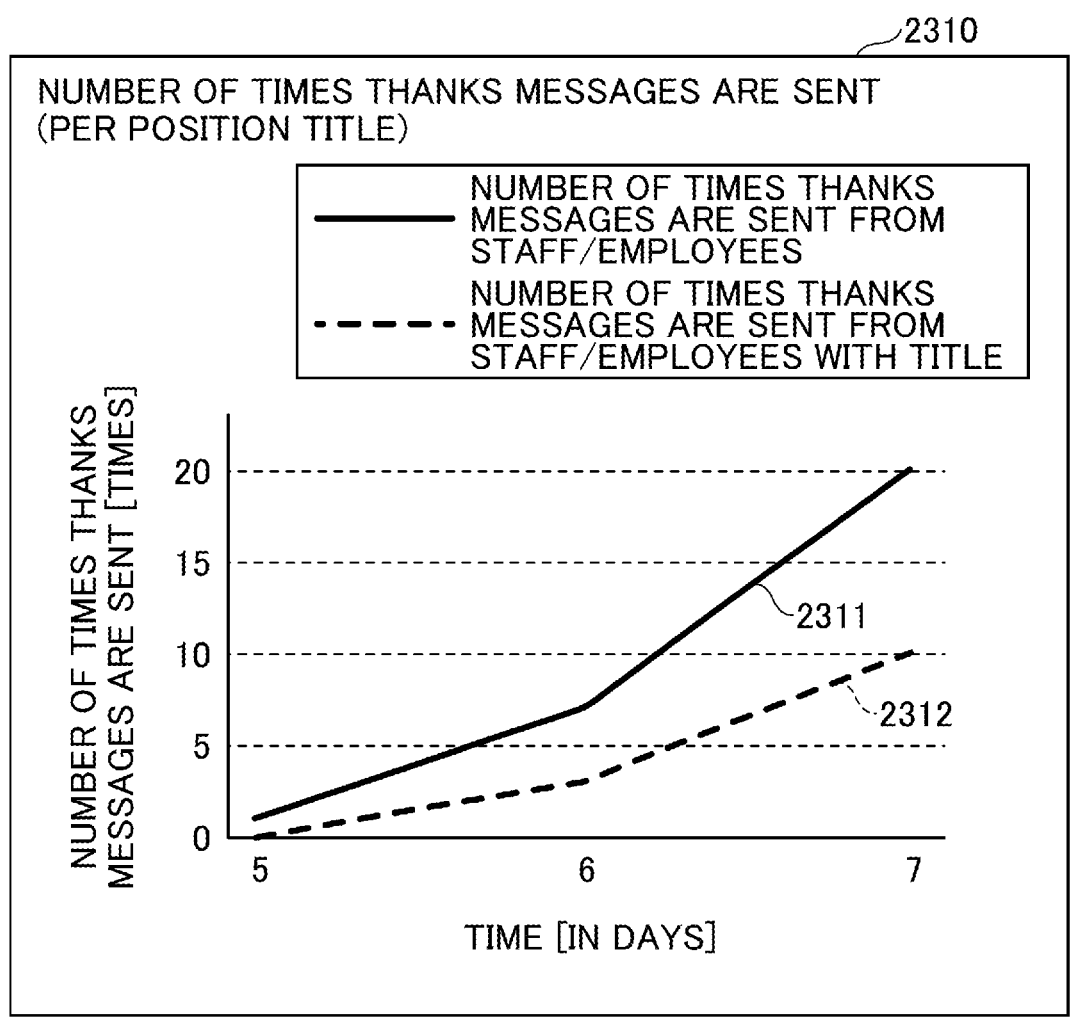
FIGS. 23A and 23B are diagrams (2) that illustrate examples of information provided by the evaluation assisting system according to the fourth embodiment.

FIG. 23A shows other examples of information provided by the evaluation assisting device 100. For example, in step S2104 of FIG. 21A, the second output 1803 may output a graph 2310, such as that shown in FIG. 23A, to the dashboard 1813, the information terminal 1812, or the like.

In the graph 2310 shown in FIG. 23A, the horizontal axis represents the time (in days) past since the introduction of the evaluation assisting system 400, and the vertical axis represents the number of times thanks messages have been sent. Also, the graph 2310 shows the respective numbers of thanks messages that are sent, namely 2311 and 2312, per position title. For example, human resources personnel may show the graph 2220 shown in FIG. 23A, pertaining to a department where the number of thanks messages sent does not show much increase, so that it is possible to easily check whether or not the manager of this department where the number of thanks messages shows little increase is using thanks messages.

Note that the second output 1803 acquires a sender-user ID or the like, included in the transmission history of thanks messages, collected by the collector 1801, and, by using the sender's user ID or the like acquired thus, identifies the sender-user's department, position title, and so forth, from the user information management system 30. By this means, the second output 1803 can study the transmission histories of thanks messages, collected by the collector 1801, on a per position title basis, and graph them.

Figure 23B:
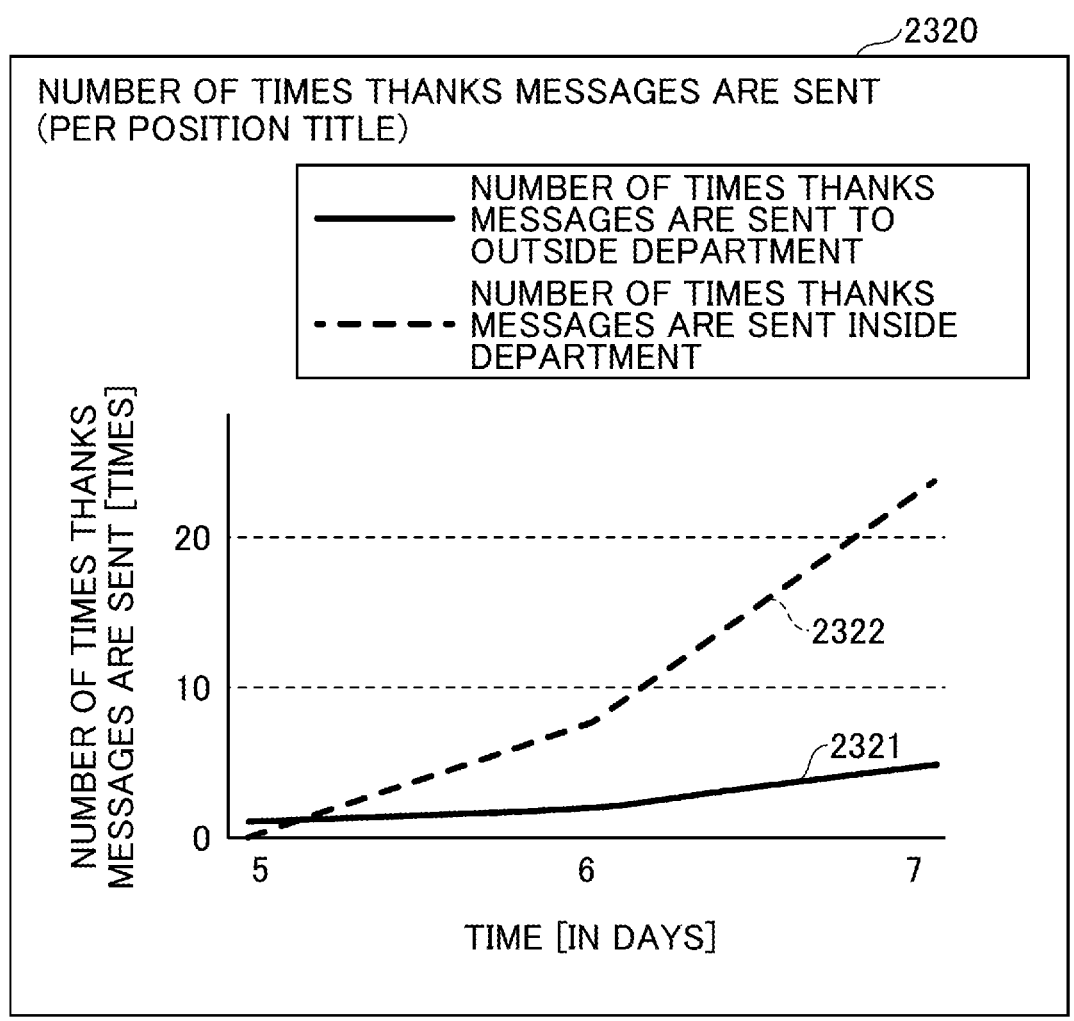

FIG. 23B shows other examples of information provided by the evaluation assisting device 100. For example, in step S2104 of FIG. 21A, the second output 1803 may output a graph 2320, such as that shown in FIG. 23B, to the dashboard 1813, the information terminal 1812, or the like.

In the graph 2320 shown in FIG. 23B, the horizontal axis represents the time (in days) past since the introduction of the evaluation assisting system 400, and the vertical axis represents the number of times thanks messages have been sent. Also, the graph 2320 shows the number of times 2321 thanks messages are sent to outside the department, and the number of times 2322 thanks messages are sent within the department.

From this graph 2320, human resources personnel and so forth can easily understand that the number of thanks messages sent within the same department is increasing, that the number of thanks messages sent to outside the department is not increasing greatly, and so forth.

FIG. 24A shows other examples of information provided by the evaluation assisting device 100. For example, in step S2104 of FIG. 21A, the second output 1803 may output a table 2401, such as that shown in FIG. 24A, to the dashboard 1813, the information terminal 1812, or the like. This table 2401 further analyzes, for example, the result of the graph 2320 shown in FIG. 23B, the result of the graph 2210 shown in FIG. 22A, and so forth, in table format.

FIG. 24B shows other examples of information provided by the evaluation assisting device 100. For example, in step S2104 of FIG. 21A, the second output 1803 may output a table 2402, such as that shown in FIG. 24B, to the dashboard 1813, the information terminal 1812, or the like. This table 2402 further analyzes, for example, the result of the graph 2320 shown in FIG. 23B, the result of the graph 2310 shown in FIG. 23A, and so forth, in table format.

In this way, the second output 1803 can output a report about the status of use of the evaluation assisting system 400, for example, in graph format or in table format. Note that the evaluation assisting system 400 may only sort data in the second output 1803, and prepare and output graphs or tables by using the function of the dashboard 1813.

(Information Providing Process 2)

FIG. 21B shows other examples of the information providing process according to the fourth embodiment. This process shows an example of the information providing process that the information manager 405 of the evaluation assisting device 100 performs at predetermined time intervals, or at designated dates and times. Note that, since the contents of the following process are basically the same as in the process described with reference to FIG. 21A, detailed description will be omitted here for the same process as in the process of FIG. 21A.

In step S2111, the collector 1801 collects, from the human resources system 20, the history of thanks messages sent without the predetermined character sequence.

In step S2112, the collector 1801 acquires the transmission history of thanks message registration requests, stored in the storage 406 or the like.

In step S2113, the first output 1802 prepares a report about the users managed under the human resources system 20. For example, the first output 1802 may prepare a report showing the status of use of thanks messages by multiple users belonging to a given department, based on information collected by the collector 1801.

In step S2114, the second output 1803 sends the prepared report to the manager of the above-department by e-mail or the like, for example. Alternatively, the second output 1803 may send the prepared report to human resources personnel, instead of (or in addition to) the manager of the given department, by e-mail, or the like.

FIG. 24C shows an example of information provided by the first output 1802. For example, in step S2114 of FIG. 21B, the first output 1802 may send a report including a table 2403, such as that shown in FIG. 24C, to the information terminals 1811, 1812 and the like, by e-mail.

In the example of FIG. 24C, in the table 2403, information such as "thanks in the department," "thanks to outside department," "thanks from outside the department," "thanks points," and "rate of use of the evaluation assisting system" is sorted for each of a plurality of users (user A, user B, and so on).

"Thanks in the department" indicates the number of thanks messages sent between users in the same department. For example, in the example of FIG. 24C, the number of times that user A has sent thanks messages to other users in the same department is 30.

"Thanks to outside the department" indicates the number of times users have sent thanks messages to users of other departments. For example, the example of FIG. 24C indicates that the number of times user A has sent thanks messages to users in other departments is 10.

"Thanks from outside the department" indicates the number of thanks messages users have received from users of other departments. For example, in the example of FIG. 24C, the number of times user A has received thanks messages from users of other departments is 11.

"Thanks points" indicates the total of thanks points for users from other users. For example, the example of FIG. 24C indicates that user A obtained 280 thanks points in a predetermined period.

"Rate of use of the evaluation assisting system" indicates, for example, the proportion of thanks messages sent by using the communication system 10, among the thanks messages sent by users. For example, the example of FIG. 24C shows that 75% of the thanks messages sent by user A were sent by using the communication system 10.

Note that the first output 1802 may send a report containing the graphs that have been described above with reference to FIG. 22A, FIG. 22B, FIG. 23A, and FIG. 23B, in addition to (or instead of) the table 2403 shown in FIG. 24C, to the information terminals 1811 and 1812. Similarly, the first output 1802 outputs a report containing the tables shown in FIG. 14A and FIG. 14B, in addition to (or instead of) the table 2403 shown in FIG. 24C, to the information terminals 1811 and 1812.

As described above, according to each embodiment of the present invention, it becomes possible, by using the communication system 10 that allows communication between a plurality of users, to easily register user evaluations with the human resources system 20 that manages user evaluations.

Note that the user is an example of the object of evaluation, and the human resources system 20 is an example of the second system that manages the evaluations of objects of evaluation. For example, the second system may be a system that manages the evaluation of various objects that are subject to evaluation, such as organized teams/groups, shops, exhibitions, concerts, goods, products, cuisine, vehicles, entertainment lodging facilities, sightseeing spots, or services.

For example, when a predetermined service is the object of evaluation, the sensing bot 11 senses an evaluation message that evaluates the predetermined service from the communication between a plurality of users, and sends communication information including the detected evaluation message to the evaluation assisting device 100.

Also, the evaluation assisting device 100 that receives the communication information from the sensing bot 11 may send a request for registration of the evaluation of the predetermined service, with the second system that manages the evaluation of the predetermined service.

Similarly, when a predetermined sightseeing spot is the object of evaluation, the sensing bot 11 detects an evaluation message that evaluates the predetermined sightseeing spot from the communication between a plurality of users, and sends communication information including the detected evaluation message, to the evaluation assisting device 100.

Also, the evaluation assisting device 100 that receives the communication information from the sensing bot 11 may send a request for registration of the evaluation of the predetermined sightseeing spot, with the second system that manages the evaluation of the predetermined sightseeing spot.

As described above, according to this embodiment, it becomes possible, by using a first system that allows communication between a plurality of users, to easily register the evaluation of the object of evaluation with the second system that manages the evaluations of objects of evaluation.

Additional Notes

The functions of each embodiment described above can be realized by one or more process circuits. Here, a "process circuit" in this specification means a processor that is programmed by software to perform functions, such as a processor implemented by an electronic circuit, and includes, an ASIC (Application Specific Integrated Circuit), a DSP (Digital Signal Processor), or an FPGA (Field Programmable Gate Array) designed to perform the above-described functions, or devices such as conventional circuit modules.

Also, the set of devices described in the embodiments is simply representative of at least one of several computing environments for implementing the embodiments disclosed herein. In some embodiments, the evaluation assisting device 100 may include multiple computing devices, which may be referred to as "a server cluster." These computing devices are configured to communicate with each other over any type of communication link, including a network, shared memory, etc., to perform the processes disclosed herein. Similarly, the communication system 10 may include multiple computing devices that are configured to communicate with each other.

Furthermore, the evaluation assisting device 100 and the communication system 10 can be configured to share and perform the herein-disclosed process steps, such as the process illustrated in FIG. 10, in various combinations. For example, a process performed by a given unit may be performed by the evaluation assisting device 100. Similarly, the function of a given unit can be performed by the communication system 10. Also, the elements of the evaluation assisting device 100 and the sensing bot 11 may be integrated into one device, or may be divided into a plurality of devices.

What is claimed is:

1. A system comprising:
an evaluation assisting system; and
a first system connected to the evaluation assisting system via a network,
wherein the first system includes:
first circuitry; and
a first memory storing executable instructions which, when executed by the first circuitry, cause the first circuitry to:
execute a sensing process to detect predetermined communication that takes place between a plurality of users in the first system; and
in response to detecting the predetermined communication by the sensing process, send communication information according to the detected predetermined communication to the evaluation assisting system, and wherein the evaluation assisting system includes:
second circuitry; and
a second memory storing executable instructions which, when executed by the
second circuitry, cause the second circuitry to:
connect the first system and multiple second systems via the network, the second systems managing evaluations of objects of evaluation;
receive the communication information from the first system via the network;
in response to receiving the communication information from the first system, acquire first information for specifying an object of evaluation;
based on the first information, specify a type of the object of evaluation;
generate a request for registration of an evaluation of the object of evaluation, the evaluation being based on the predetermined communication related with the received communication information;
determine which information among multiple pieces of information associated with the evaluation needs to be included in the request for registration based on the specified type of the object of evaluation;
select one of the multiple second systems which corresponds to the type of the object of evaluation specified based on the first information;
send the generated request for registration to the selected second system via the network; and
cause the selected second system to register the evaluation.

2. The system according to claim 1,
wherein the received communication information further includes second information for specifying a sender-user, between the plurality of users, who sends the predetermined communication between the plurality of users,
wherein information about the sender-user with respect to the predetermined communication is acquired based on the second information included in the received communication information, and
wherein the generated request for registration requests the registration of the evaluation of the object of evaluation provided by the sender-user, the sender-user being specified based on the information about the sender-user acquired.

3. The system according to claim 2,
wherein the executable instructions further cause the second circuitry to connect, via the network, to a third system that manages information about the object of evaluation, and
wherein the information about the object of evaluation is acquired from the third system via the network.

4. The system according to claim 3,
wherein the third system further manages information about the sender-user, and
wherein the information about the sender-user is acquired from the third system via the network.

5. The system according to claim 2,
wherein the second information includes the information about the sender-user, and
wherein the information about the sender-user is acquired from the second information included in the received communication information.

6. The system according to claim 2,
wherein the object of evaluation is a recipient-user of the predetermined communication between the plurality of users,
wherein the first information is information about the recipient-user and identifies the recipient-user in the selected second system,
wherein the information about the sender-user identifies the sender-user in the selected second system, and
wherein the generated request for registration includes the information that identifies the sender-user in the selected second system and the information that identifies the recipient-user in the selected second system.

7. The system according to claim 1,
wherein the first information includes information about the object of evaluation, and
wherein the information about the object of evaluation is acquired from the first information included in the received communication information.

8. The system according to claim 1, wherein the object of evaluation is a recipient-user of the predetermined communication between the plurality of users.

9. The system according to claim 8, wherein the evaluation includes a thanks message that expresses appreciation for the recipient-user.

10. The system according to claim 8, wherein the evaluation includes score information that evaluates the recipient-user.

11. The system according to claim 1,
wherein the object of evaluation is a recipient-user, between the plurality of users, who receives the predetermined communication between the plurality of users, and
wherein the first information is information about the recipient-user.

12. The system according to claim 11,
wherein the information about the recipient-user identifies the recipient-user in the selected second system, and
wherein the generated request for registration includes the information that identifies the recipient-user in the selected second system.

13. The system according to claim 1, wherein, upon the sending, the generated request for registration is sent to the selected second system via a web API of the selected second system.

14. The system according to claim 1, wherein the executable instructions further cause the second circuitry to output a report about the object of evaluation managed under the selected second system based on a transmission history of the generated request for registration.

15. The system according to claim 1,
wherein the received communication information includes identification information that identifies the first system, and
wherein the executable instructions further cause the second circuitry to output a report that indicates a status of use of the selected second system from the first system, based on a reception history of the received communication information or a transmission history of the generated request for registration.

16. The system according to claim 1, wherein the predetermined communication in the first system is one of:
a chat in which the plurality of users exchange messages with each other; and
a voice call between the plurality of the users.

17. The system according to claim 1,
wherein the sensing process includes extracting the predetermined communication between the plurality of users by interpretation of intention in which what each of the plurality of users intends to do is determined using machine learning.

18. The system according to claim 1,
wherein the plurality of users include a sender-user and a recipient-user, the object of evaluation being the recipient-user, and
wherein the executable instructions further cause the first circuitry to:
extract the sender-user and the recipient-user from the predetermined communication; and
send the communication information to the evaluation assisting system for an evaluation of the recipient-user such that the evaluation assisting system generates the request for registration to register the evaluation of the recipient-user in the second system.

19. The system according to claim 18,
wherein the executable instructions further cause the first circuitry to:
in response to registering the evaluation of the recipient-user in the selected second system, send a notification to an information terminal of the recipient-user; and
cause the information terminal of the recipient-user to display a screen for prompting the recipient-user to perform a reply operation to the sender-user.

20. An evaluation assisting method performed by a computer, comprising:
executing a sensing process to detect predetermined communication that takes place between a plurality of users in a first system;
in response to detecting the predetermined communication by the sensing process, sending communication information according to the detected predetermined communication to an evaluation assisting system connected to the first system via a network;
connecting the first system and multiple second systems via the network, the second systems managing evaluations of objects of evaluation,
receiving the communication information from the first system via the network;
in response to receiving the communication information from the first system, acquiring first information for specifying an object of evaluation;
based on the first information, specifying a type of the object of evaluation;
generating a request for registration of an evaluation of the object of evaluation, the evaluation being based on the predetermined communication related with the received communication information;
determining which information among multiple pieces of information associated with the evaluation needs to be included in the request for registration based on the specified type of the object of evaluation;
selecting one of the multiple second systems which corresponds to the type of the object of evaluation specified based on the first information;
sending the generated request for registration to the selected second system via the network; and
causing the selected second system to register the evaluation.

* * * * *